United States Patent [19]

Murata et al.

[11] Patent Number: 4,633,385
[45] Date of Patent: Dec. 30, 1986

[54] METHOD AND APPARATUS FOR CONTROLLING AN OPERATION SEQUENCE OF MACHINERY

[75] Inventors: Tomohiro Murata, Ebina; Norihisa Komoda, Kawasaki; Koichi Haruna, Yokohama, all of Japan

[73] Assignee: Hitachi, Ltd., Tokyo, Japan

[21] Appl. No.: 606,226

[22] Filed: May 2, 1984

[30] Foreign Application Priority Data

May 2, 1983 [JP] Japan .................................. 58-77985
May 2, 1983 [JP] Japan .................................. 58-77987

[51] Int. Cl.⁴ ........................ G06F 9/00; G06F 15/00
[52] U.S. Cl. .................................... 364/191; 364/200; 364/513; 901/6
[58] Field of Search .............................. 364/191–193, 364/513, 200, 900; 901/6–8

[56] References Cited

U.S. PATENT DOCUMENTS 4,534,001  8/1985  Nozawa et al. .................. 364/474

FOREIGN PATENT DOCUMENTS 1179782  12/1984  Canada ............................ 364/191
57-172405  10/1982  Japan ............................. 364/191

*Primary Examiner*—Jerry Smith
*Assistant Examiner*—Allen MacDonald
*Attorney, Agent, or Firm*—Antonelli, Terry & Wands

[57] ABSTRACT

In order to execute a series of operation sequence including synchronization and exclusion for an automatic machine such as a robot by combining pretaught or preprogrammed unit operations, there are provided first memory for storing a start sequence of the unit operations to be synchronized or excluded, second memory for storing operation status of the unit operations and third memory for storing operation command to start the unit operations. The unit operations to be started are determined by referring the start sequence and the operation status of the unit operations read from the memories, and the corresponding operation commands are read out of the third memory to squentially start the unit operations.

In order to execute an repetitive operation of similar works, there is provided fourth memory for storing basic operation patterns common to the repetitive operation in a non-repetitive manner. Further, sub-parameters are generated as many as the number determined by the number of times of repetition required and the content of operation, desired operation content is selected in accordance with the stored basic operation patterns and the generated sub-parameters, and the selected operation content is executed as many times as the number of sub-parameters, and the number of times of execution of the basic operation pattern executed is counted at an end of a repetitive section.

17 Claims, 35 Drawing Figures

FIG. 4

| SYNC/EXCL STEP | COMPLETION STAND-BY OPERATION NUMBER | | | START STAND-BY OPERATION NUMBER | | |
|---|---|---|---|---|---|---|
| 1 | 100 | 108 | | 102 | | |
| 2 | 105 | 106 | 104 | 107 | | |
| 3 | 112 | 107 | | 109 | | |
| 4 | 109 | | | 101 | | |

| OPERATION NUMBER | START MANAGEMENT STATUS (200) | OPERATION STATUS (201) | MESSAGE NUMBER (202) | PARAMETER SELECTION NUMBER (203) |
|---|---|---|---|---|
| 100 | 1 | 1 | 2 | |
| 101 | 1 | 1 | 3 | |
| 102 | 0 | 1 | 1 | 20 |
| 107 | 0 | 1 | | |
| 108 | 1 | 1 | | |
| 109 | 1 | 2 | | |
| 110 | 0 | 1 | | |
| 112 | 0 | 1 | | |

| MESSAGE NUMBER | CONTROL INFORMATION (204) | | DESTINATION (205) | PARAMETER SELECTION NUMBER | LINK POINTER |
|---|---|---|---|---|---|
| 1 | $i_1$ | $j_1$ | ROBOT 1 | 10 | |
| 2 | m | | MACHINE TOOL 1 | | |
| 3 | $i_2$ | $j_2$ | ROBOT 2 | | |
| 4 | $i_1$ | $j_3$ | ROBOT 1 | 20 | |

| SYNC/EXCL STEP CONTROL INFORMATION | | COMPLETED OPERATION NO. REGISTRATION INFORMATION | | | NEXT-STARTED OPERATION NO. REGISTRATION INFORMATION | | | | |
|---|---|---|---|---|---|---|---|---|---|
| SYNC/EXCL STEP NO. | PREFERENTIAL PROCESSING SEQUENCE NO. | OPERATION NO. | | | START SEQUENCE NO. | | | | |
| | | | | | OPERATION NO. | DELAY TIME | | | |
| 10 | 1 | 100 | | | 0 | | | | |
| | | | | | 106 | 0 | | | |
| 11 | 2 | 100 | 108 | | 0 | | | | |
| | | | | | 102 | 0 | | | |
| 12 | 3 | 102 | | | 0 | | | | |
| | | | | | 103 | 0 | | | |
| 13 | 4 | 103 | | | 1 | 2 | | | |
| | | | | | 104 | 0 | 105 | 0 | |
| 15 | 20 | 107 | 101 | | 0 | | | | |
| | | | | | 109 | | | | |
| 16 | 23 | 109 | | | 0 | | | | |
| | | | | | 101 | | | | |

FIG. 15

| MESSAGE NO. | CONTROL INFORMATION | DESTINATION |
|---|---|---|
| 1 | $m_1$ | ROBOT 1 |
| 2 | $m_2$ | MACHINE TOOL 1 |
| 3 | $m_3$ | ROBOT 2 |
| 4 | $m_4$ | ROBOT 1 |

FIG. 28

| PROCESS NO. | MAX COUNT | CURRENT COUNT | COMPLETION STAND-BY OPERATION NO. | | START STAND-BY OPERATION NO. | |
|---|---|---|---|---|---|---|
| 1 | 1 | 0 | -101 | | -100 | |
| 2 | 1 | 0 | -100 | | 10 | |
| 3 | 9 | 7 | 10 | | 20 | 30 |
| 4 | 1 | 0 | 20 | 30 | 40 | |
| 5 | 4 | 2 | 40 | | 999 | |

| OPERATION NO. | OPERATION PARAMETER | GENERATED SEQUENCE NO. | NOS. OF GENERATED BASES | NOS. OF GENERATED PARAMETERS |
|---|---|---|---|---|
| -100 | 1000 | 0 | 1000 | 9 |
| ″ | 1000 | 1 | 1001 | 9 |
| ″ | 1000 | 2 | 1002 | 9 |
| ″ | 1000 | 3 | 1003 | 9 |
| -101 | 100 | 0 | 1000 | 4 |

| OPERATION NO. | OPERATION PARAMETER | GENERATED SEQUENCE NO. | PROCESSING STATUS | NOS. OF GENERATED PARAMETERS |
|---|---|---|---|---|
| 10 | 0 | 0 | 0 (COMPLETED) | — |
| 20 | 1000 | 7 | 1 (IN PROGRESS) | — |
| 30 | 1000 | 7 | 1 | — |
| 40 | 0 | 0 | 0 | — |
| −100 | 1000 | 8 | 0 | 9 |
| −101 | 0 | 0 | 0 | 0 |

| OPERATION NO. | OPERATION PARAMETER | GENERATED SEQUENCE NO. | DESTINATION | OPERATION COMMAND | COMPLETION DISCRIMINATION FORMULA |
|---|---|---|---|---|---|
| 10 | 1000 | 0 | ROBOT 1 | OPERATION 1-1 | A * B |
| ⌇ | ⌇ | ⌇ | ⌇ | ⌇ | ⌇ |
|  | 1000 | 8 | ROBOT 1 | OPERATION 1-9 | A * B |
|  | 1001 | 0 | 〃 | OPERATION 1'-9 | C * D |
| ⌇ | ⌇ | ⌇ | ⌇ | ⌇ | ⌇ |
|  | 1001 | 8 | ROBOT 1 | OPERATION 1'-9 | C * D |
|  | 1003 | 0 | ROBOT 1 | OPERATION 1'''-1 |  |
| ⌇ | ⌇ | ⌇ | ⌇ | ⌇ |  |
| 10 | 1003 | 8 | ROBOT 1 | OPERATION 1'''-9 |  |
| 20 | 1001 | 0 | ROBOT 2 | OPERATION 2-1 |  |
| ⌇ | ⌇ | ⌇ | ⌇ | ⌇ |  |
|  | 1001 | 8 | ROBOT 2 | OPERATION 2-9 |  |
|  | 1003 | 0 | ROBOT 2 | OPERATION 2'''-1 |  |
| ⌇ | ⌇ | ⌇ | ⌇ | ⌇ |  |
| 20 | 1003 | 8 | ROBOT 2 | OPERATION 2'''-9 |  |
| 30 | 0 | 0 | CONVEYER | OPERATION 3 |  |
| 40 | 1000 | 0 | ROBOT 1 | OPERATION 4 |  |
| ⌇ | ⌇ | ⌇ | ⌇ | ⌇ |  |
| 40 | 1003 | 0 | ROBOT 1 | OPERATION 4''' |  |

89  891

METHOD AND APPARATUS FOR CONTROLLING AN OPERATION SEQUENCE OF MACHINERY

The present invention relates to method and apparatus for controlling an operation sequence (execution sequence of control programs) of machinery, and more particularly to a method and apparatus for controlling an operation sequence of a plurality of machine tools, such as industrial robots, which method and apparatus are useful in executing a complex cooperative manufacturing process including synchronization and exclusion among machine tools, starting up a work sequence or storing, executing and modifying a repetitive operation of similar operations of a numeric control (NC) machine.

A factory automation (FA) has recently been described. In the field of factory automation, it is frequently necessary to combine automatic machine tools or robots to efficiently carry out various handling or assembling operations.

When teaching playback type robots or automatic machine tools are combined to carry out a cooperative manufacturing process, a number of interlocks are required for synchronization and exclusion among the machine tools or robots and the creation of a control program is very troublesome. At the start of the cooperative manufacturing process, the interlock arrangement is complex when the operation sequence is started up while safely avoiding conflict among the machine tools and resulting deadlock of the apparatus, and hence a long work time is required.

For example, in order to execute the operation sequence including the synchronization and the exclusion among the machine tools, commands for turning an interlock signal on and off and commands for stand-by of the interlock signal are previously inserted before and after each unit operation when teaching data or a control program is prepared.

When the synchronization and the exclusion among the machine tools are controlled in such a manner, the number of machine tools which are to be synchronized or excluded increases and the member of unit operations (execution sequence of control programs) to be interlocked increases accordingly. As a result, the manpower for preparing the teaching data and the program including the interlocks is extremely large and debugging of a series of program thus prepared is troublesome. Further, since the commands for generating the interlock signals for the synchronization and the commands for stand-by of the interlock signals are inserted in the series of steps of the operation sequence, a large manpower and a long time are required to alter or modify the operation sequence. When the operation sequence including the synchronization and the exclusion among the machine tools is to be altered or modified, it is necessary to sequentially decode the series of steps of the operation sequence to modify the commands related to the interlocks inserted over a plurality of control units. Accordingly, a long time is required for the modification or the alteration of the operation sequence and errors may be additionally introduced due to the modification of the program. Therefore, a long time is required to complete the system.

On the other hand, when the series of steps of the operation sequence (management procedure of the operation sequence) is to be programmed, a unit operation of the robot, for example, "grasp a part" is functionally a single operation, but since the teaching data or the program is different for each shape and position of the part, the operation "grasp a part" has a different pattern depending on the type and the position of the part. Accordingly, each operation should be programmed as an independent unit operation. Thus, the sequence program is long and a long time is required to register the sequence.

When similar operations are to be repeatedly carried out by the automatic machine, such as a robot, for example, when screws are to be driven repeatedly with different operation patterns depending on positions of threaded holes and diameters of the screws, all operation sequences should be previously stored in a memory. When all operation sequences for the repetition of similar works are stored in the memory, a long time is required to program the sequence and a long time is also required to modify the program. When the series of steps of the operation sequence is controlled by a conventional sequencer, all operation sequences are stored in the memory as executable conditions, and the executable condition is checked for each operation, and if it is executable, the operation is executed (for example, an output relay is energized or deenergized).

When similar operations are repeatedly executed in this manner, it has been required heretofore to store the execution sequence of all operations in the memory as the executable conditions. Accordingly, the greater the number of times of the repetition of the similar operations is, the more troublesome is the work to store the sequence Further, when the operation sequence prepared is to be corrected, the executable conditions of the respective operations must be checked one by one in order to assure exact correction of the executable conditions of the operations due to the change of the operation sequence. Accordingly, a large manpower and a long time are required to change the operation sequence.

It is a first object of the present invention to provide a method for controlling an operation sequence which allows easy preparation of a cooperative operation sequence including interlocks for synchronization and exclusion among machine tools or an operation sequence including a number of operation patterns and allows easy test and debugging of the operation sequence and easy correction of the operation sequence It is a second object of the present invention to provide a method and apparatus for controlling a repetitive operation sequence which allows easy storing and execution of the repetitive sequence of similar operations, allows easy alteration of the sequence and reduces the memory capacity required to store the sequence.

In order to achieve the first object in a system in which a series of steps of an operation sequence including the synchronization or the exclusion is prepared by combining pretaught or preprogrammed unit operations for an automatic machine, such as a robot, there are provided means for storing a start sequence (execution start order) of the unit operations to be synchronized or excluded, means for storing the execution status of the unit operations and means for storing operation commands for starting the unit operations, and the unit operation to be started is determined based on the start sequence of the unit operations and the execution status stored in the memory means and corresponding operation commands are read out of the memory means to sequentially start the unit operations.

In order to achieve the second object in a control unit for executing the repetitive operation of the similar operations for an automatic machine, such as a robot, basic operation patterns common to all repetitive operations are stored in a memory in a non-repetitive manner, and in the execution of the operation sequence, a necessary number of sub-parameters (control program parameter values) are generated in accordance with the number of times of repetition and types of operations, desired types of operations are selected based on the stored basic operation patterns and the generated sub-patterns, the operations are executed by the number of times equal to the number of parameters, and the number of times of execution of the basic operation putterns executed at the ends of the repetitive sections is counted.

These and other objects will become more apparent when preferred embodiments of this invention are considered in connection with the drawings, in which:

FIG. 4 shows a format of a synchronization/exclusion step definition table in FIG. 3;

FIG. 5 shows a format of an operation management table in FIG. 3;

FIG. 6 shows a format of a control message table in FIG. 3;

FIG. 12 shows a format of a synchronization/exclusion step definition table in FIG. 11;

FIG. 15 shows a format of a control message table in FIG. 11;

FIG. 28 shows a format of an operation pattern registration table of FIG. 26;

FIG. 29 shows a format of a sub-parameter generation table of FIG. 26;

FIG. 30 shows a format of an operation status management table of FIG. 26;

FIG. 31 shows a format of an operation command registration table;

Figure 1:
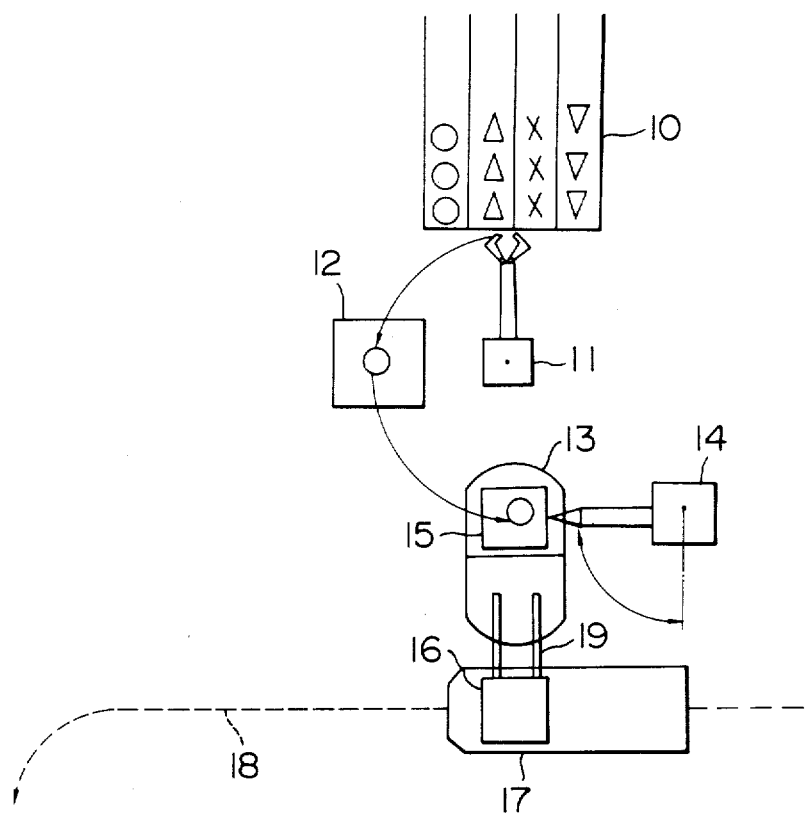
FIG. 1 shows a configuration of a part mounting station having two robots.
Figure 2:
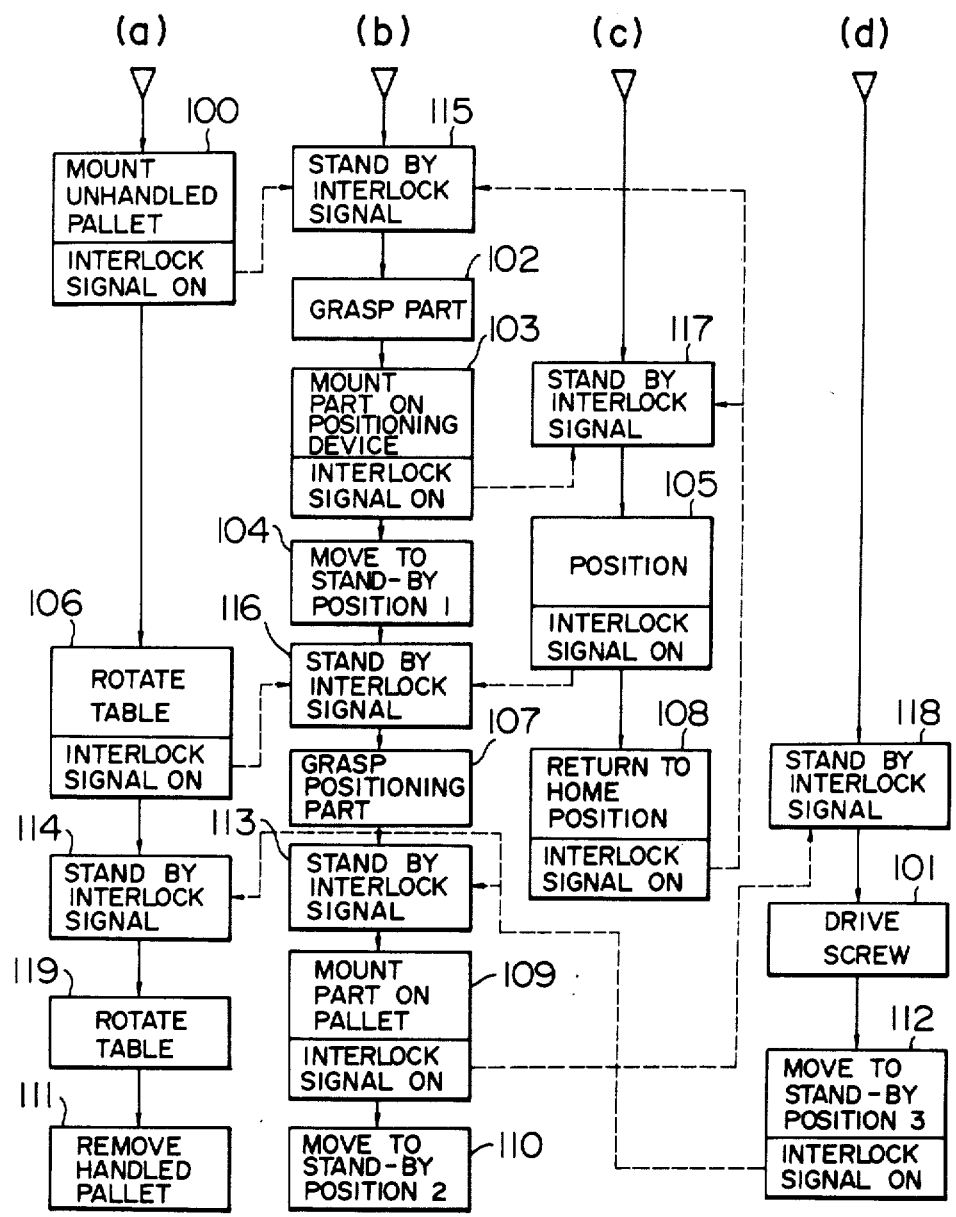
FIG. 2 shows a sequence chart for a synchronization and exclusion operation in FIG. 1.

Referring to FIGS. 1 and 2, a cooperative sequence control is first explained. FIG. 1 shows a configuration of a part mounting station having two robots.

Numeral 10 denotes a part supply conveyer, numeral 11 denotes a part handling robot, numeral 12 denotes a part positioning device, numeral 13 denotes a rotary table, numeral 14 denotes a screw driving robot, numeral 15 denotes a pallet to which a part is being mounted, numeral 16 denotes an unhandled pallet, numeral 17 denotes a pallet carrying truck, numeral 18 denotes a guide line for the carrying truck and numeral 19 denotes a pallet setting and taking guide rail. Symbols o, x and Δ on the part supply conveyer 10 denote types of parts, and the setting and taking guide rail 19 can be extended from the truck 17 as required.

FIG. 2 shows a synchronization/exclusion sequence chart for the machine tools of FIG. 1.

The rotary table 13, the part handling robot 11, the screw driving robot 14 and the positioning device 12 are cooperatively operated under a synchronization/exclusion control as shown in FIG. 2. For the sake of simplification, the part handling robot 11 is referred to as a robot 1, and the screw driving robot 14 is referred to as a robot 2. Sequence (a) shows an operation sequence of the rotary table 13, sequence (b) shows an operation sequence of the robot 1, sequence (c) shows an operation sequence of the positioning device 12, and sequence (d) shows an operation sequence of the robot 2. Those machine tools are cooperatively operated under program control by a computer. Blocks 100–119 denote unit movements of the machine tools, that is, units of teaching data or programs, and a solid arrow line between the blocks indicates that the unit movement of the next block is started after the operation of the previous block has been completed. A broken arrow line indicates an interlock signal for synchronization or exclusion among the machine tools. When the machine tool standing by for the interlock signal receives the interlock signal, the operation sequence proceeds to the next step.

In FIG. 2, the operation 109 in which the robot 1 mounts a positioned part on the pallet 15 and the operation 101 in which the robot 2 drives a screw are interlocked so that those two operations are not simultaneously executed. This prevents collision of the arms of the robot 1 and the robot 2 on the pallet 15.

The operation 102 in which the robot 1 grasps the part is interlocked such that it is started in synchronism with the completion of the operation 100 in which the unhandled pallet 17 is mounted on the rotary table 13 and the operation 108 in which the positioning device 12 is returned to a home position.

An embodiment of the cooperative sequence control is described below.

Figure 3:
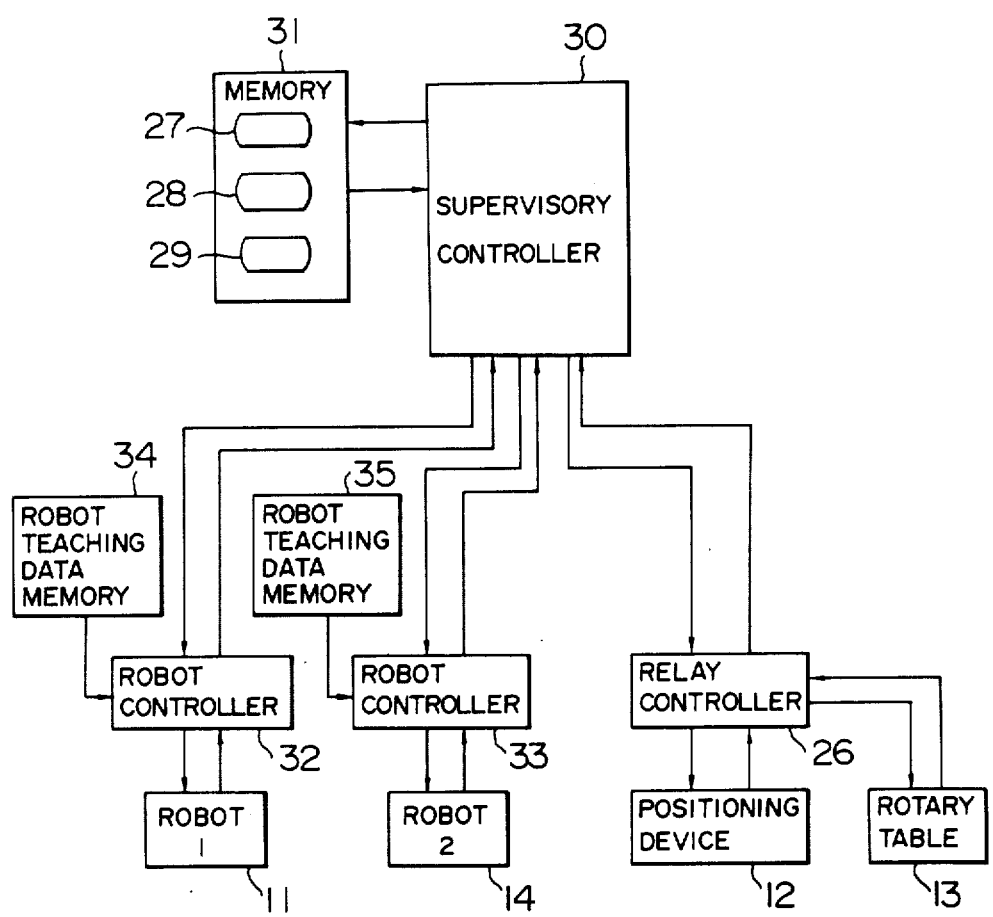
FIG. 3 shows a configuration of a control system of the part mounting station which uses a supervisory controller, in accordance with one embodiment of the present invention.

FIG. 3 shows the configuration of a control system for a part mounting station in accordance with a first embodiment of the present invention.

Numeral 30 denotes a supervisory controller, numeral 31 denotes a supervisory controller memory, numerals 32 and 33 denote robot controllers, numerals 34 and 35 denote robot teaching data memories and numerals 11 and 14 denote playback type robots. The robot 11 corresponds to the robot 1 (part handling robot) and the robot 14 corresponds to the robot 2 (screw driving robot). Numeral 26 denotes a relay controller, numeral 12 denotes the part positioning device, numeral 13 denotes the rotary table and numerals 27, 28 and 29 denote tables which contain supervisory control information.

A method for storing the operation sequence of the unit operations of the four machine tools shown in FIG. 2, in the tables 27, 28 and 29 in the supervisory controller memory 31 is explained. The table 27 is synchronization/exclusion step definition table, in which combinations of the unit operations which stand by for the interlock signals for the synchronization or exclusion and the unit operations from which the interlock signals are expected are registered.

FIG. 4 shows a format of the synchronization/exclusion step definition table 27 of FIG. 3.

The synchronization stand-by steps between the operation 102 (grasp a part) of the robot 1 in FIG. 2, and the operation 100 (mount an unhandled pallet) and the operation 100 (return to home position) of the rotary table 13 and the positioning device 12 are registered as completion stand-by numbers 100 and 108 and a start stand-by number 102, as shown in a synchronization/exclusion step 1 in FIG. 4. The exclusion between the operation 109 (mount a part on the pallet) of the robot 1 and the operation 101 (drive a screw) of the robot 2 is registered as completion stand-by numbers 109, and a completion stand-by number 109 for a start stand-by number 101, as shown in synchronization/exclusion steps 3 and 4 in FIG. 4.

Information on the execution of the unit operations of the machine tools indicated by those operation numbers is stored in the operation management table 28 in a format shown in FIG. 5.

In FIG. 5, a start management status 200 includes a start stand-by status and started status. The former is represented by "0" while the latter is represented by "1". It indicates the progres status of the operation sequence stored in the synchronization/exclusion step definition table 27. An operation status 201 in the next column includes a completed status and an in-operation status. The former is represented by "1" and the latter is represented by "2". It indicates whether the unit operation corresponding to the started operation number is completed or in progress. A message number 202 in the next column is a pointer which points to a start point to retrieve control information to be sent to the machine tools, from the control information stored in the control message table 29. A parameter selection number 203 in the next column is a key information for selecting one control information from a plurality of control information registered for one operation number.

Control information to be sent to the machine tools by the supervisory controller 30 is stored in the control message table 29 in correspondence to the operation numbers started by the supervisory controller 30 in accordance with the synchronization/exclusion step definition table 27 and the operation management table 28.

FIG. 6 shows a format of the control message table 29 of FIG. 3.

When the control messages are to be registered for the operation numbers, it may be convenient, in a certain case, to register a plurality of control messages for one operation number. For example, for the operation "grasp a part" of the robot, it may be desired to select an appropriate one of a plurality of grasp patterns depending on a type and a position of the part. In this case, the operation "grasp a part" is registered in the operation management table of FIG. 5 as a basic operation for one operation number, and operation programs or operation parameters for specific grasp operation patterns are linked by link pointers and arranged in the control message table of FIG. 6 with each parameter being assigned with a parameter selection number. When the operation number corresponding to the operation "grasp a part" is to be executed, the parameter selection number is designated so that a desired operation pattern is selected from the control information 204 registered in the control message table shown in FIG. 6 and sent to the destination 205.

The message numbers 1 and 4 in FIG. 6 correspond to the above example. The message number 1 designated by the operation number 102 (grasp a part) of FIG. 5 is linked to the message number 4 by the link pointer and the parameter selection numbers 10 and 20 are assigned to the respective message numbers. Control information 204 includes a start program number $i_m$, an operation parameter number $j_n$, and a relay ON/OFF pattern m. The message numbers 1 and 4 have the same start program number $i_1$ as the control information 204 but have different operation parameter numbers $j_1$ and $j_3$. Accordingly, specific grasp operation patterns are different for the operation parameter numbers $j_1$ and $j_3$. For example, in the operation number 102 of FIG. 5, the parameter selection number 20 is designated and the message number 4 is selected from the message numbers 1 and 4 and the grasp operation designated by the operation pattern of the operation parameter number $j_3$ is executed.

If it is desired to register a plurality of operation patterns which cannot be attained by merely changing the operation parameter number $j_n$, for the same operation number, the start program number $i_m$ may be changed.

The supervisory controller 30 controls the synchronization and the exclusion among the machine tools in accordance with the tables 27, 28 and 29.

Figure 7:
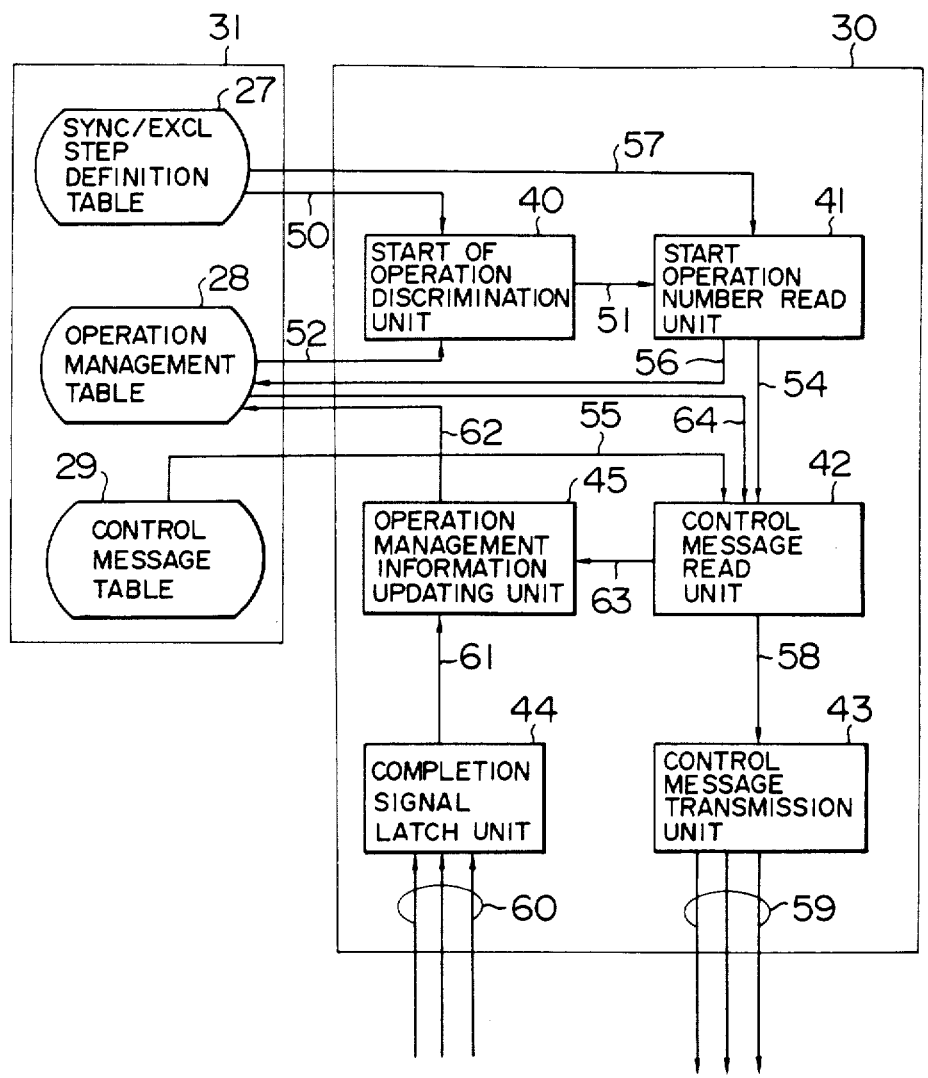
FIG. 7 shows a configuration of the supervisory controller of FIG. 3.

FIG. 7 shows a configuration of the supervisory controller 30 in FIG. 3.

Numeral 40 denotes a start of operation discrimination unit, numeral 41 denotes a start operation number read unit, numeral 42 denotes a control message read unit, numeral 43 denotes a control message transmission unit, numeral 44 denotes a completion signal latch and numeral 45 denotes an operation management information updating unit.

Figure 8:
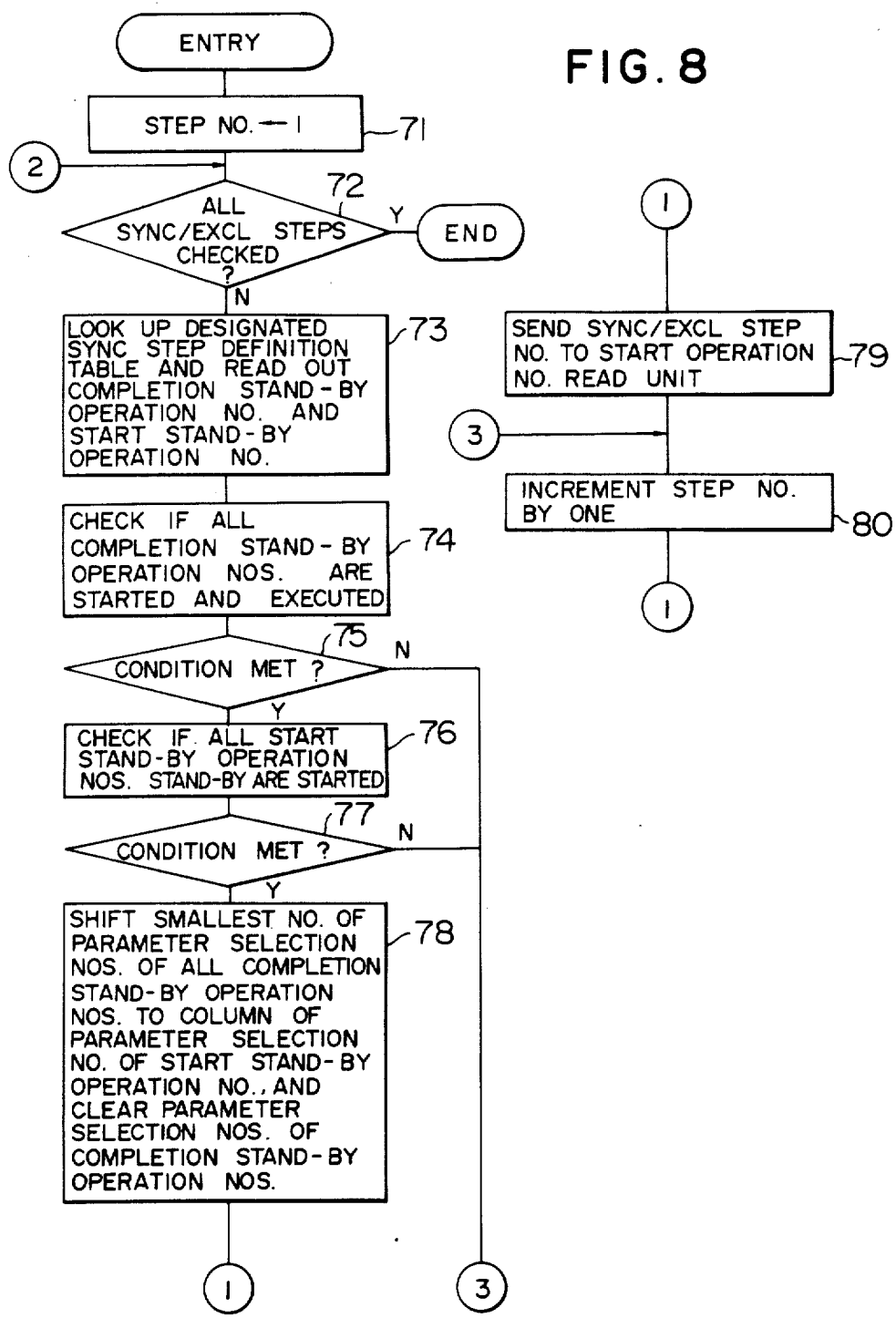
FIG. 8 shows a process flow chart for an execution discrimination unit.

The start of operation discrimination unit 40 reads out the completion stand-by and start stand-by operation numbers as well as the start management status 200 and the operation status 201 thereof from the synchronization/exclusion step definition table 27 and the operation management table 28 (arrow lines 50 and 52), selects the executable synchronization/exclusion step number in accordance with the flow chart shown in FIG. 8 and sends it to the start operation number read unit 41 (arrow line 51). The start of operation discrimination unit 40 also shifts the parameter number designated for the completion stand-by operation registered in the synchronization/exclusion step number to the column of the parameter selection number for the start stand-by operation.

Figure 9:
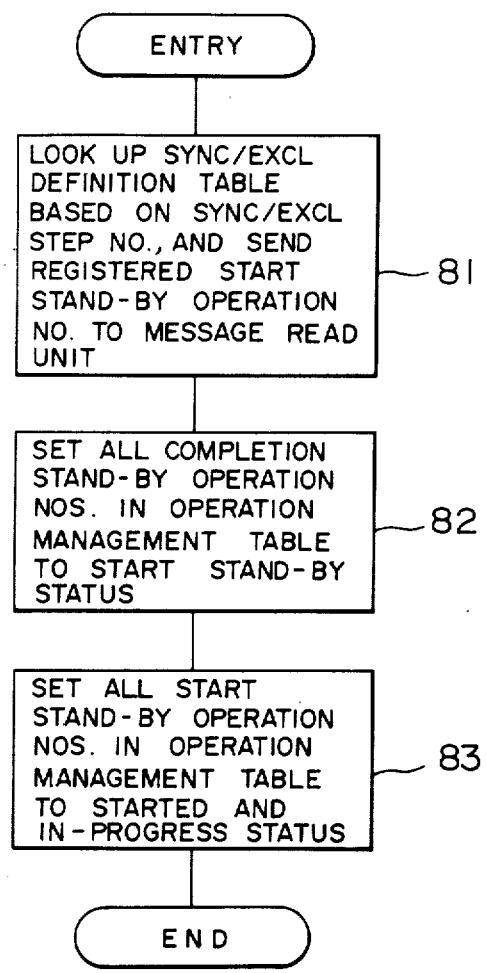
FIG. 9 shows a process flow chart for an execution number read unit.

The start operation number read unit 41 reads out the start stand-by operation number from the synchronization/exclusion step definition table 27 in accordance with a flow chart shown in FIG. 9 (arrow line 57) and sends it to the message read unit 42 (arrow line 54). It also sets the start management status 200 of the corresponding operation number in the operation management table to "1" (started status) and sets the operation status 201 to "1" (in-progress status) (arrow line 56).

Figure 10:
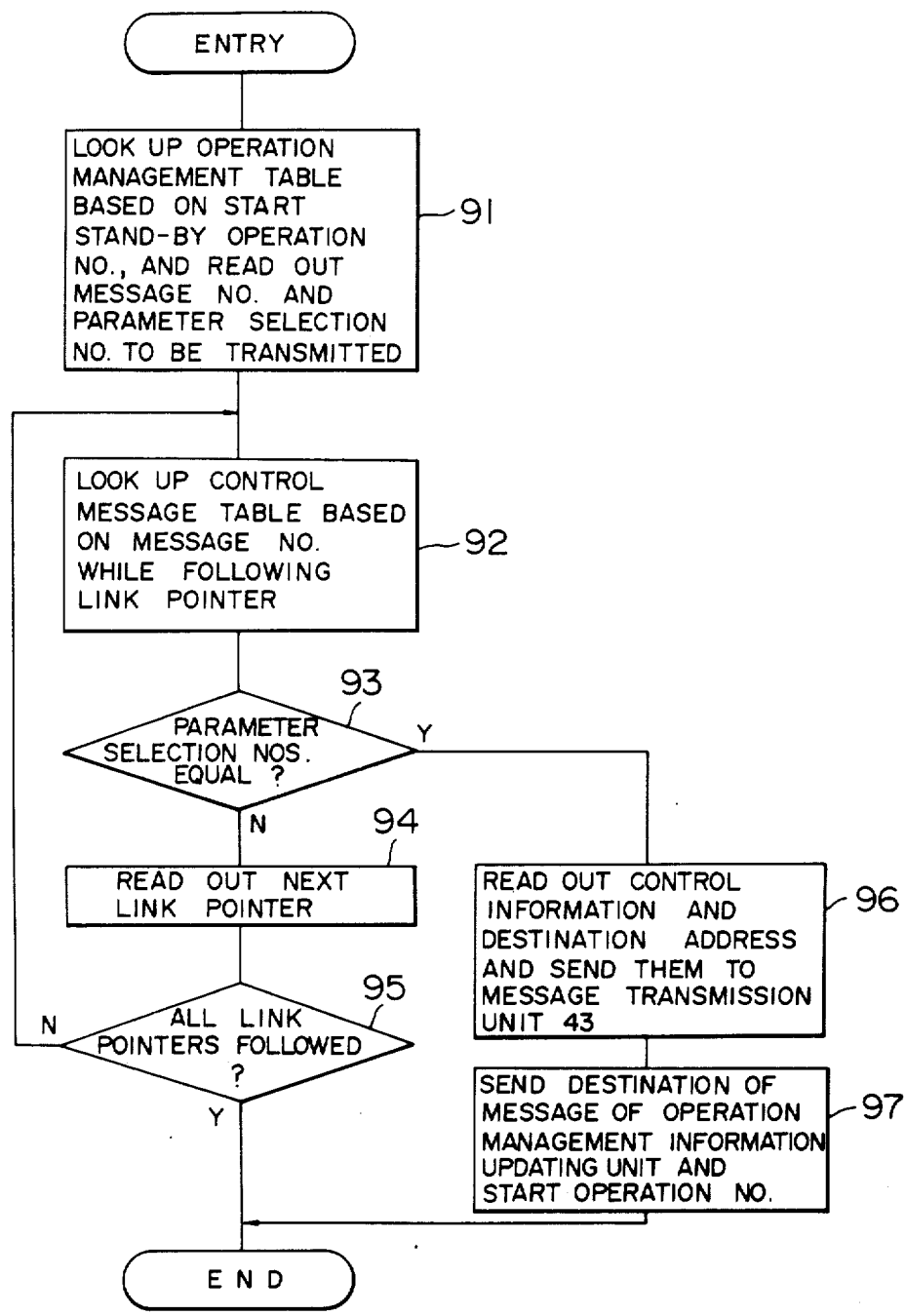
FIG. 10 shows a process flow chart for a control message read unit.

The message read unit 42 reads out the message number and the parameter selection number to be transmitted from the operation management table (arrow line 64) in accordance with a flow chart shown in FIG. 10 based on the operation number sent from the start operation number read unit 41 (arrow line 54), and looks for the message number having the same parameter selection number while following the link pointer with the message number read from the control message table 30 being at a head position. It reads out the control information and the destination address of the message number having the same parameter selection number (arrow line 55) and sends it to the control message transmission unit 43 (arrow line 58). The message read unit 42 indicates the destination of the message and the start operation number to the operation management information updating unit 45 (arrow line 63).

The control message transmission unit 43 decodes the destination address and sends the control information to the controller of the corresponding machine tool (arrow 59).

The machine tool executes the pretaught or preprogrammed unit operation in accordance with the control information sent from the supervisory controller 30, and sends a completion signal to the completion signal latch 44 (arrow line 60) when the unit operation has been completed.

The operation management information updating unit 45 refers the content of the latched completion signal and changes the operation status of the operation number from the in-progress status to the completed status based on the information received from the message read unit 42 (arrow line 62).

The supervisory controller 30 repeats the above operation to automatically control the synchronization and the exclusion at the start of the unit operation of the machine tool in accordance with the operation sequence stored in the tables 27, 28 and 29 in the supervisory controller memory 31.

The operation flow chart of the start of operation discrimination unit 40 shown in FIG. 8 is explained. In a block 71, the step number of the synchronization/exclusion step definition table 27 of FIG. 4 is set to "1", and in a block 73, the completion stand-by operation number and the start stand-by operation number of the synchronization/exclusion step definition table 27 are read out. In a block 74, it is checked to see if all completion standby operation numbers have been started and executed ("1", "1") based on the operation management table 28 of FIG. 5, and in blocks 75 and 76, if the above condition is met, it is checked to see if all start stand-by operation numbers of FIG. 4 are standing by the start ("0") in FIG. 5. In blocks 77 and 78, if the above condition is met, the smallest one of the parameter selection numbers of all completion stand-by operation numbers of FIG. 5 is shifted to the column of the parameter selection number of the start stand-by operation number, and the parameter selection numbers of the completion stand-by operation numbers are cleared. In blocks 79 and 80, the synchronization/exclusion step number read from FIG. 4 is sent to the start operation number read unit 41 and the step number is incremented by one. The sequence returns to the block 72 where it is checked to see if all synchronization/exclusion steps have been examined, and if not, the sequence again proceeds to the block 73.

Figure 27:
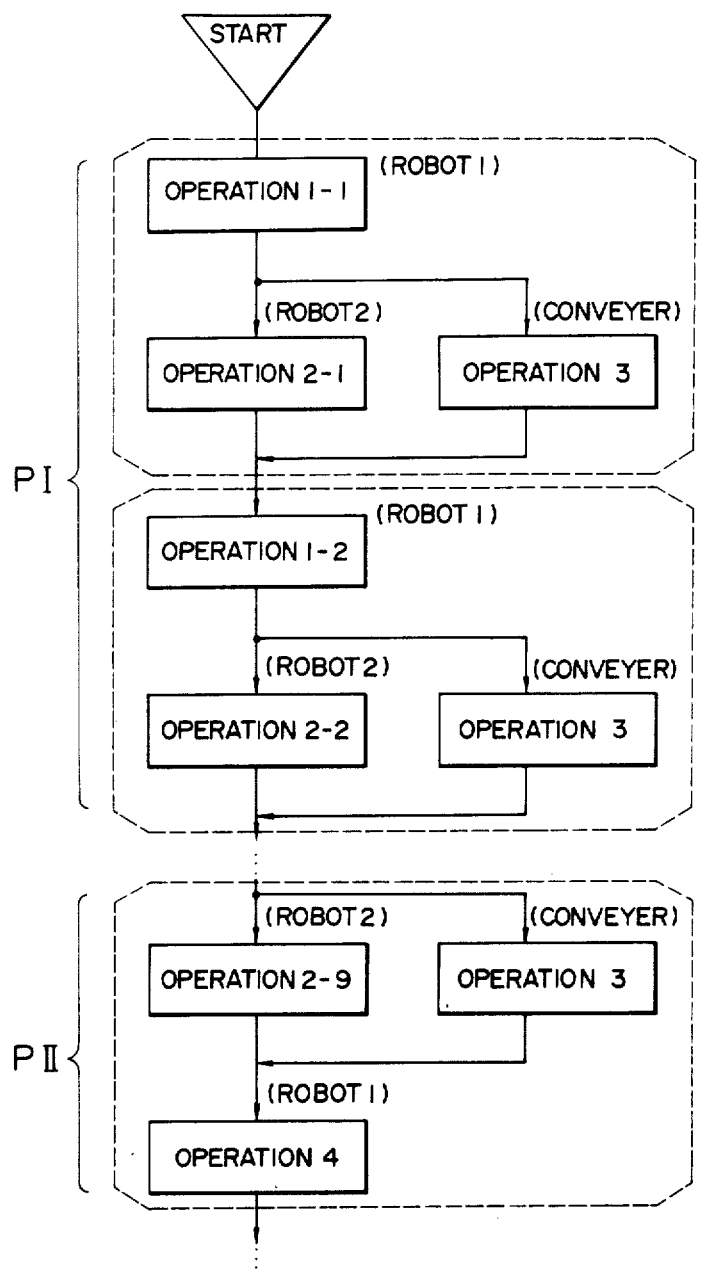
FIG. 27 shows a flow chart of basic operation patterns in FIG. 23.

The operation flow chart of the start operation number read unit 41 shown in FIG. 9 is explained. In a block 81, the synchronization/exclusion step definition table 27 of FIG. 27 is looked up based on the synchronization/exclusion step number, and the registered start stand-by operation number is sent to the message read unit 42. In a block 82, all completion stand-by operation numbers in the operation management table 28 of FIG. 5 are set to the start stand-by status ("0"). In a block 83, all start stand-by operation numbers in the operation management table 28 are set to the started status ("1") and the in-progress status ("2").

The process flow chart of the control message read unit 42 shown in FIG. 10 is explained. In a block 91, the operation management table 28 of FIG. 5 is looked up based on the start stand-by operation number, and the message number and the parameter selection number to be transmitted are read out. In a block 92, the control message table 29 of FIG. 6 is looked up based on the message number while following the link pointer. If the parameter selection numbers are equal, the control information and the destination address are read out in blocks 93, 96 and 97, they are sent to the message transmission unit 43 and the destination of the message and the start operation number are sent to the operation management information updating unit 45. In the block 93, if the parameter selection numbers are not equal, the sequence proceeds to a block 94 where the next link pointer is read out and a similar processing is executed.

By registering the combination of the unit operations to be synchronized or excluded, of the start control including the synchronization and the exclusion of the unit operations of the four machine tools shown in FIG. 2, in the tables 27, 28 and 29 of the supervisory controller memory 31, the supervisory control unit 30 selectively starts the unit operations stored in the robot operation teaching data memories 34 and 35 and manages the completion of the operations or selectively drives necessary ones of the relays on the relay controller 26. Thus, a complex part mounting sequence including the synchronization and the exclusion can be readily attained.

In the present embodiment, by providing an area for designating the parameter selection number in the operation management table 27, one of a plurality of control messages can be selected in accordance with the type of part and started as the unit operation by the parameter selection number designated in accordance with the part to be grapsed when the unit operation "grasp a part" is to be started.

Thus, when the robot is to sequentially handle several types of parts and repeat operations which are functionally identical but differ in specific portions, such as the force to grasp the part and the grasping position of the part, only the operation "grasp a part" is stored in the operation sequence, and only the parameter selection number is changed at the start of the unit operation for each type of part to be grasped. Thus, various operation patterns can be executed by registering only one unit operation number in the operation sequence. Accordingly, the number of unit operation numbers registered in the supervisory control memory 31 is much smaller than the number required when the actual operation patterns are individually registered, and the capacity of the supervisory control memory 31 for storing the operation sequence and the manpower to register the operation sequence are reduced.

While the start management status 200 and the operation status 201 are separately stored in the table of FIG. 5, they may be encoded together and stored as one status.

While the supervisory controller 30 is separate from the robot controllers 32 and 33 in the present embodiment, they may be combined into one controller.

Figure 11:
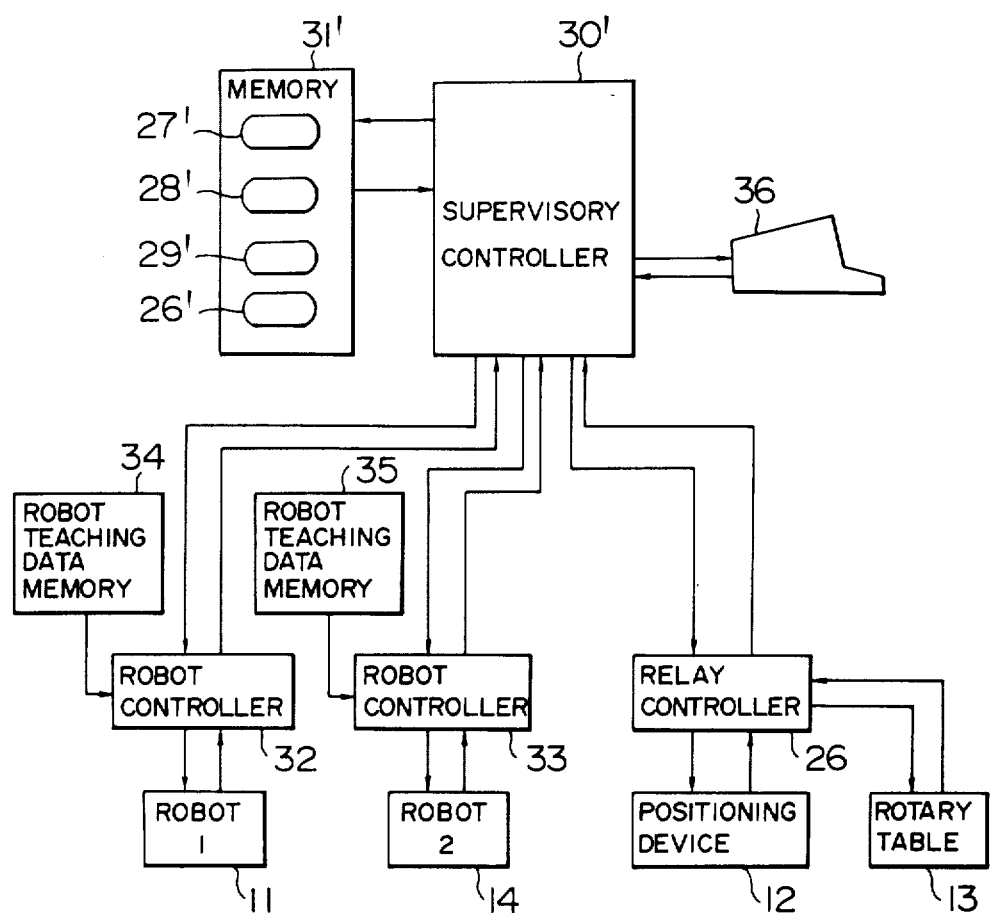
FIG. 11 shows a configuration of a part mounting station in accordance with another embodiment of the present invention.

FIG. 11 shows a configuration of a control system of the part mounting station in accordance with a second embodiment of the present invention.

In FIG. 11, like numerals to those shown in FIGS. 1, 2 and 3 denote like elements. A monitoring terminal 36 is added to the configuration of FIG. 3 and an operation performance record table 26' is added to the supervisory controller memory 31'. The formats of the synchronization/exclusion step definition table 27', the operation management table 28' and the control message table 29' of the supervisory control memory 31' are different from those of the tables 27, 28 and 29 of FIG. 3, and the configuration of the supervisory controller 30' is different from that of the supervisory controller 30 of FIG. 3.

FIG. 12 shows the format of the synchronization/exclusion step definition table 27' of FIG. 11.

In FIG. 11, the synchronization stand-by between the operation 102 of the robot 1, and the operation 100 (mount unhandled pallet) and the operation 108 (return to home position) of the rotary table 13 and the positioning device 12 is registered as the completion stand-by operation numbers 100 and 108 and the start stand-by operation number 102, as shown in the synchronization-/exclusion step number 11 of FIG. 12. The exclusion between the operation 109 (mount a part on pallet) of the robot 1 and the operation 101 (drive a screw) of the robot 2 is registered as the completion stand-by operation numbers 101 and 107 for the start stand-by operation number 109, and the completion stand-by operation number 109 for the start stand-by operation number 101, as shown in the synchronization/exclusion step numbers 15 and 16 of FIG. 12. Similarly, in order to start the operation 103 after the execution of the operation 102, the operation number is registered as shown in the step number 12, and in order to start the operations 104 and 105 after the execution of the operation 103, the operation numbers are registered as shown in the step number 13.

The next start operation number registration information and the synchronization/exclusion step control information in FIG. 12 are explained. The synchronization/exclusion step number in the synchronization/exclusion step control information is a sequential number uniquely imparted to each combination of the unit operation which stands by for the interlock condition for the synchronization or exclusion and the unit operation from which the interlock condition is expected when such combination is registered. The preferential processing sequence number is start sequence control information for starting the registered synchronization/exclusion step of FIG. 12 while checking the completion of the operation, step by step, when the system is started up, and it sets up the start sequence of the synchronization/exclusion step.

The next start operation number registration information includes start management information 1201 and start-up management information 1202. As the start management information, the operation number to be started and a delay time for the start are set. By setting the delay time, the start timing is delayed by a specified time when the operation number is started. As the start-up management information, the start sequence number is set as the start sequence control signal for sequentially starting the system, operation by operation when a plurality of next start operation numbers are registered for the synchronization/exclusion step number. A utilization method for the start sequence number will be described later.

Figure 13:
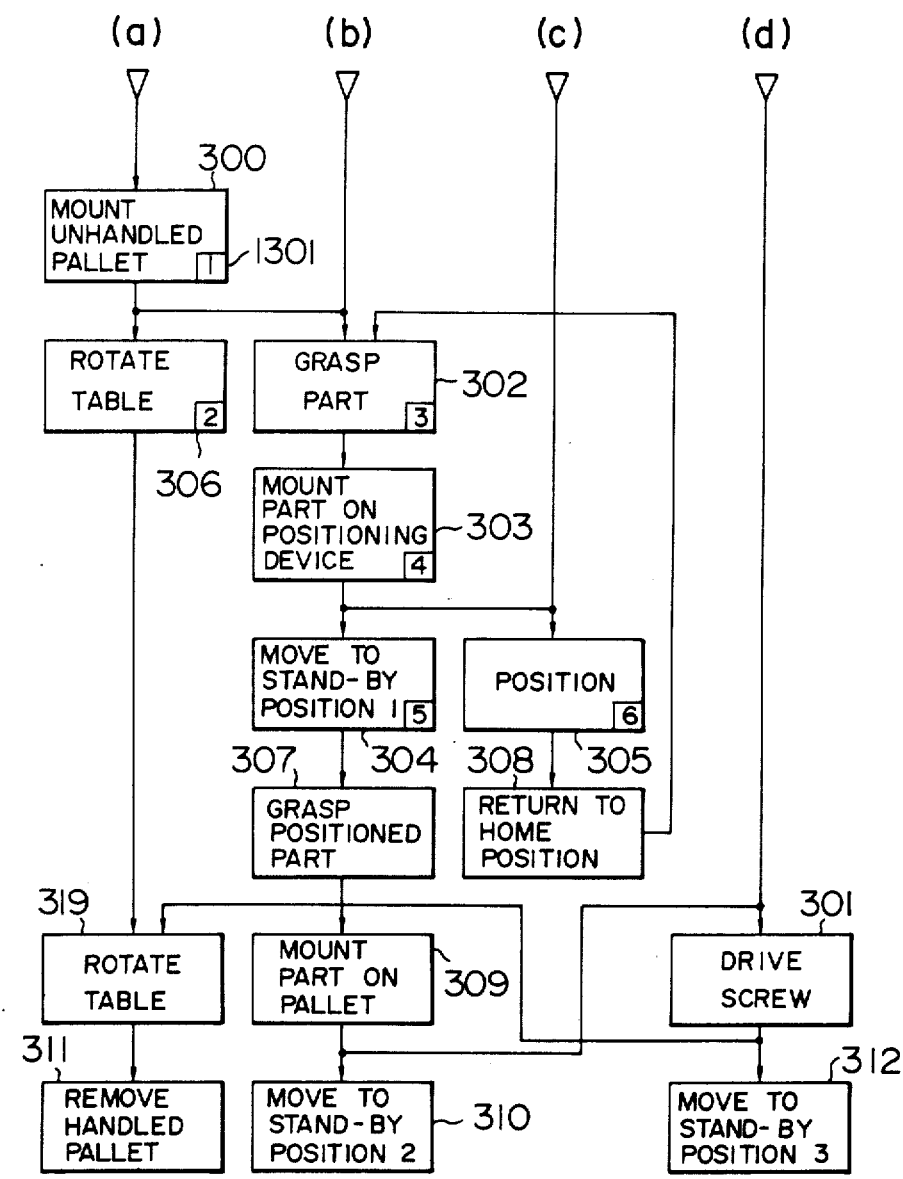
FIG. 13 shows an operation sequence chart of a machine tool of the part mounting station in a start-up mode.

Referring to FIG. 13, a method for setting the preferential processing sequence number and the start sequence number of the start-up management information is explained.

FIG. 13 shows a sequence chart which is identical in content to FIG. 2. In FIG. 13, in order to facilitate the understanding of the start sequence of the operations, the blocks which stand by for the interlock shown in FIG. 2 are omitted and the interlock signals are shown by solid arrow lines. Sequence (a) shows the operation sequence of the rotary table, sequence (b) shows that of the robot 1, sequence (c) shows that of the positioning device and sequence (d) shows that of the robot 2. For example, the operations 306 and 302 and the operations 304 and 305 can be simultaneously started so long as the start condition is met. However, since the interlocks may be misset or insufficient when the system is started up or tested, it is not safe to start a plurality of operations in parallel from the beginning because of a risk of collision.

Accordingly, the unit operations of the respective machine tools are sequentially executed one by one in accordance with the sequential numbers 1301 indicated in the blocks of FIG. 13, and after it has been confirmed that the interlocks are sufficient, the plurality of operations are executed in parallel while neglecting the sequence numbers.

In this case, if it is desired to start the operations in the sequence of 100-106-102-103-104-105, the preferential processing sequence numbers, 1, 2, 3 and 4 are imparted to the synchronization/exclusion step numbers 10 to 13 as shown in the synchronization/exclusion step definition table 27' of FIG. 12. Both operations 104 and 105 belong to the synchronization/exclusion step number 13. In this case, in order to set the start sequence of the operations 104-105, start sequence sub-numbers (1, 2, ...) are assigned within the same synchronization/exclusion step number.

A utilization method of the start-up information by the supervisory controller 30' when the system is started up will be described later.

Figure 14:
FIG. 14 shows a format of an operation management table in FIG. 11.

FIG. 14 shows a format of the operation management table 28' of FIG. 11.

The operation numbers of the respective machine tools are registered in the synchronization/exclusion step definition table 27'. The information on the execution of the unit operations designated by the operation numbers is stored in the operation management table 28' in the format shown in FIG. 14.

In FIG. 14, a standard execution time of each operation is stored in a standard time column, and an operation time (time from start to end of the operation) measured by a watch dog timer for each operation number started is stored in an operation time column. The start management status 200' includes a start stand-by status and a started status. The former is represented by "0" while the latter is represented by "1". It indicates the progress of the operation sequence stored in the synchronization/exclusion step definition table 27'. The operation status 201' includes a completed status and an in-progress status. The former is represented by "1" while the latter is represented by "2". It indicates whether the unit operation corresponding to the started operation number is completed or in progress. The message number 202' is a key for selecting the control information to be transmitted to the machine tools, from the control information stored in the control message table 29'. It is neglected and not transmitted when the following mask bit is ON.

The operation speed is set to "1" for a low speed and "2" for a normal speed. The mask bit is set to "0" when the message is to be transmitted, and "1" when the message is to be masked.

FIG. 15 shows a format of the control message table 29' in FIG. 11.

The control information 204' and the destination 205' to be transmitted by the supervisory controller 30' to the machine tools are registered in the control message table 29' for each message number corresponding to the operation number started by the supervisory controller 30' in accordance with the synchronization/exclusion step definition table 27' and the operation management table 28'.

Figure 16:
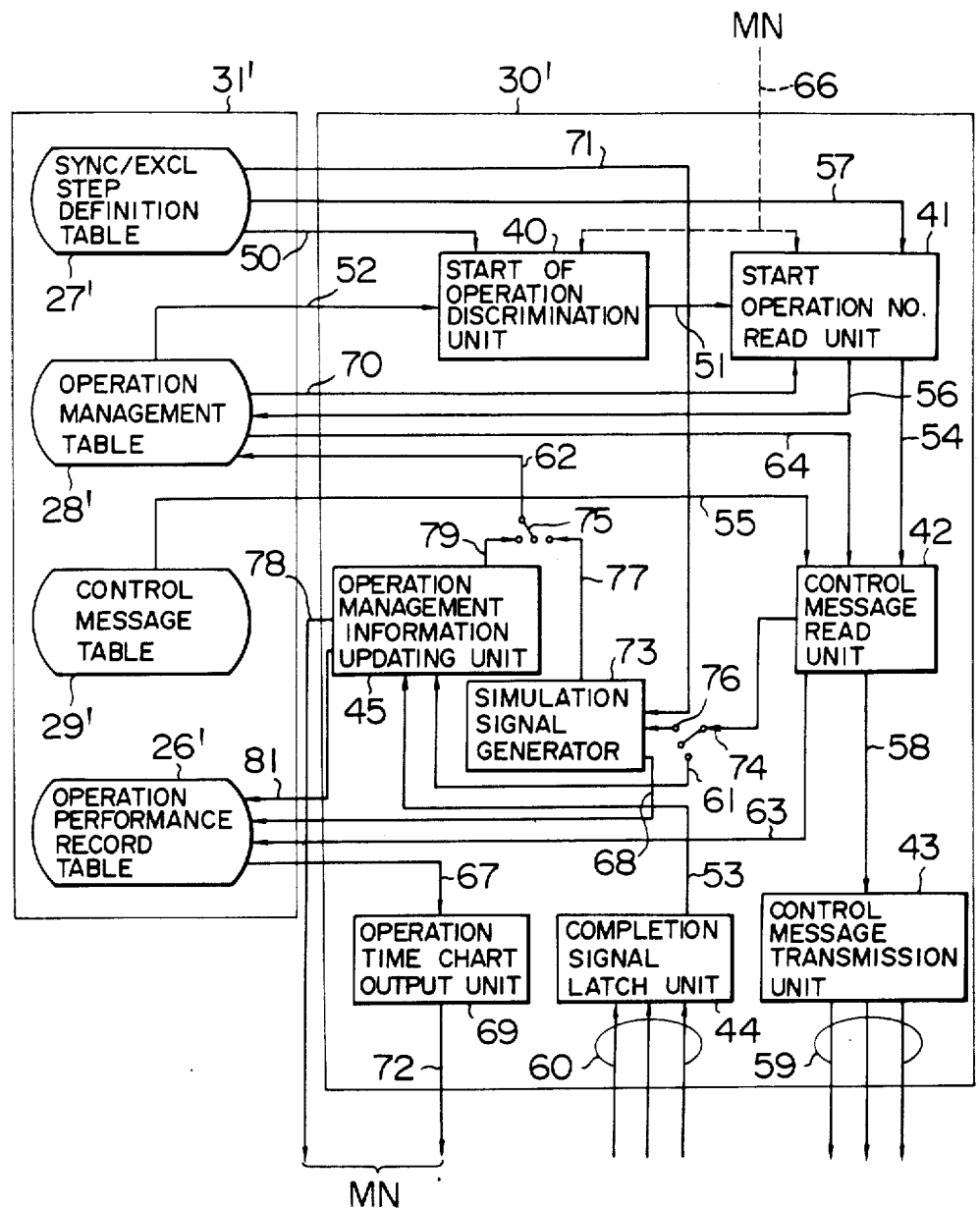
FIG. 16 shows a configuration of a supervisory controller.

FIG. 16 shows a configuration of the supervisory controller 30' of FIG. 11.

The supervisory controller 30' controls the synchronization and the exclusion among the machine tools by referring to the tables 27', 28' and 29'. In FIG. 16, numeral 40 denotes a start of operation discrimination unit, numeral 41 denotes a start operation number read unit, numeral 42 denotes a control message read unit, numeral 43 denotes a control message transmission unit, numeral 44 denotes a completion signal latch, numeral 45 denotes an operation management information updating unit, numeral 69 denotes an operation time chart output unit and numeral 73 denotes a simulation signal generator.

The operation of the supervisory controller 30' is explained for a system start-up mode and a normal operation mode.

(i) Operation in the system start-up mode

The operation in the system start-up mode comprises four steps 1–4.

The start of operation discrimination unit 40 and the start operation number read unit 41 have two operation modes 1 and 2, one of which is selected by an operation mode setting input 66 from a monitor terminal (MN).

When the operation sequence is started up, those two operation modes are selectively used.

(a) Step 1

Switches 74 and 75 for switching the modes are arranged at the output stage of the control message read unit 42 and the output stages of the operation management information updating unit 45 and the simulation signal generator 73. When the switch 74 is connected to the line 61 and the switch 75 is connected to the line 79, and the operation mode setting input 66 is set to "1", the operation mode 1 is set for the start of operation discrimination unit 40 and the start operation number read unit 41.

Figure 17:
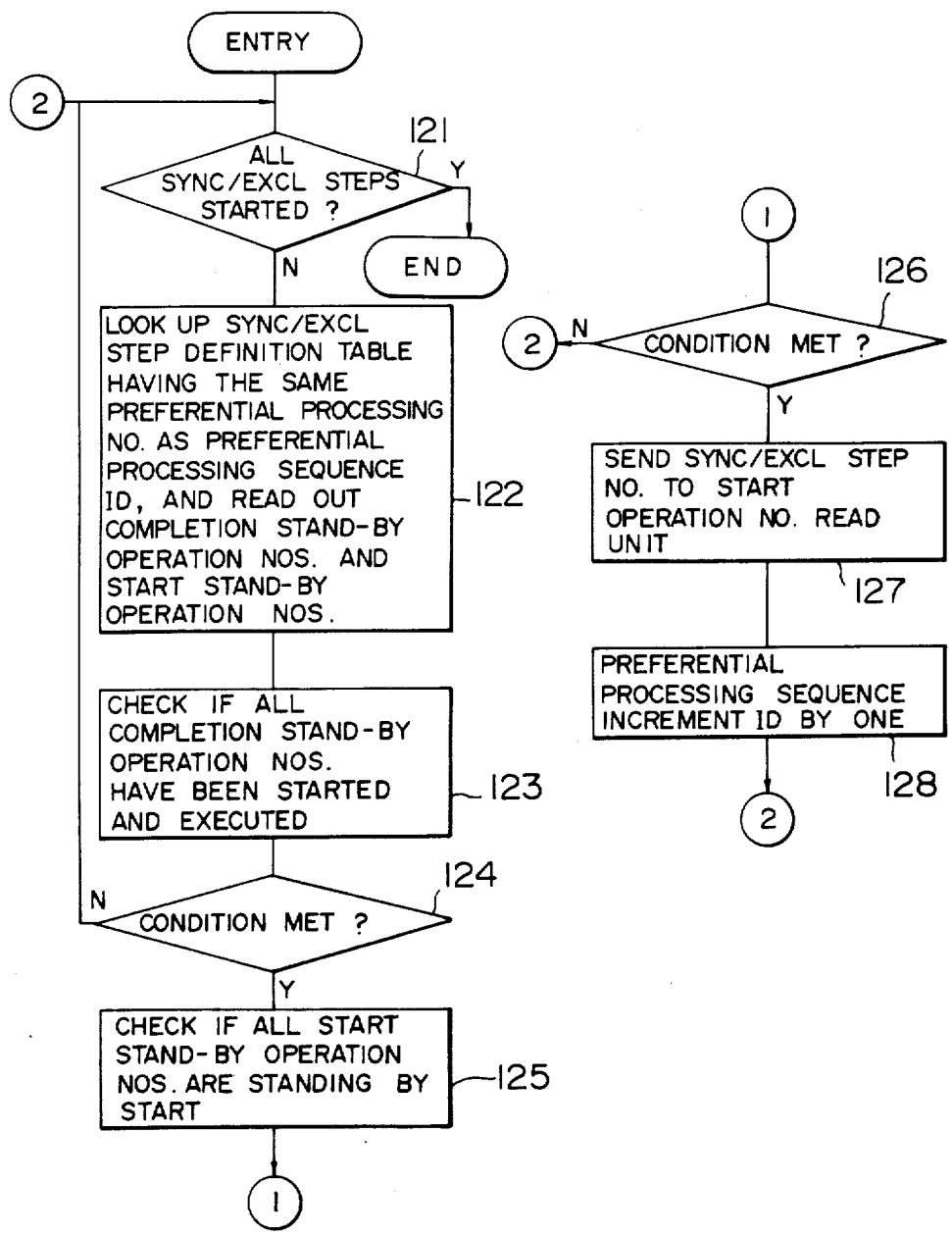
FIGS. 17 and 19 show process flow charts for an execution discrimination unit.
Figure 18:
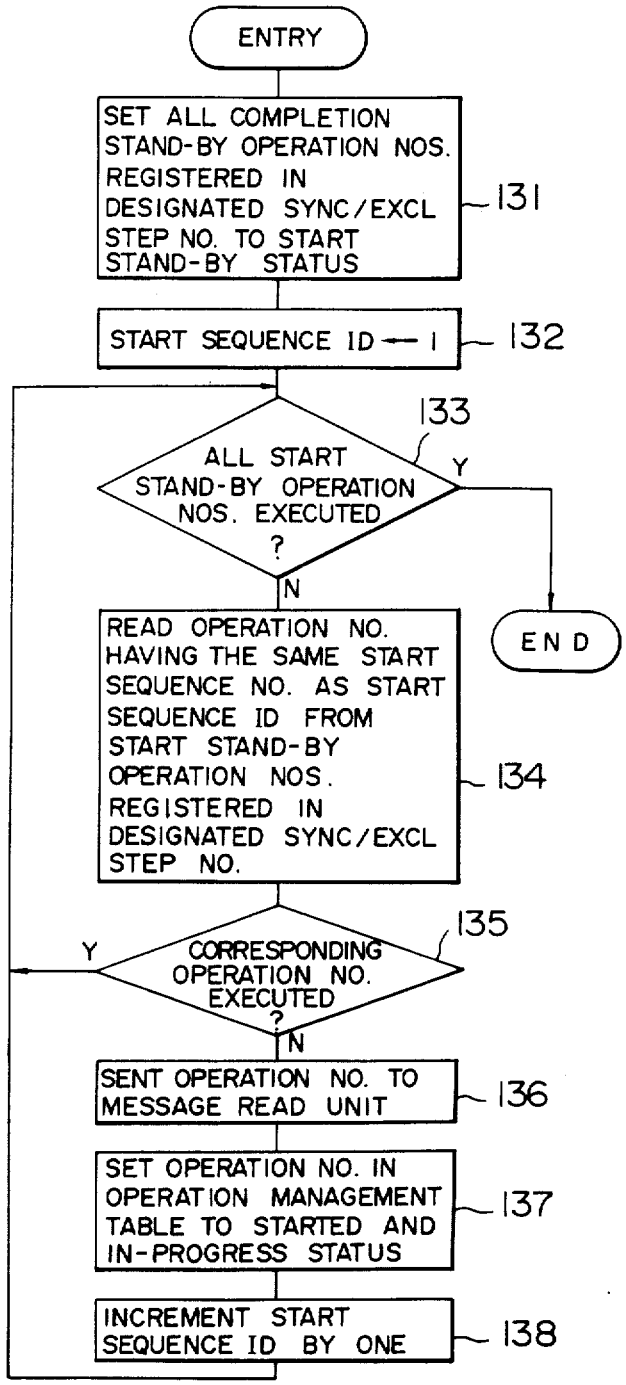
FIGS. 18 and 20 show process flow charts for an execution number read unit.
Figure 19:
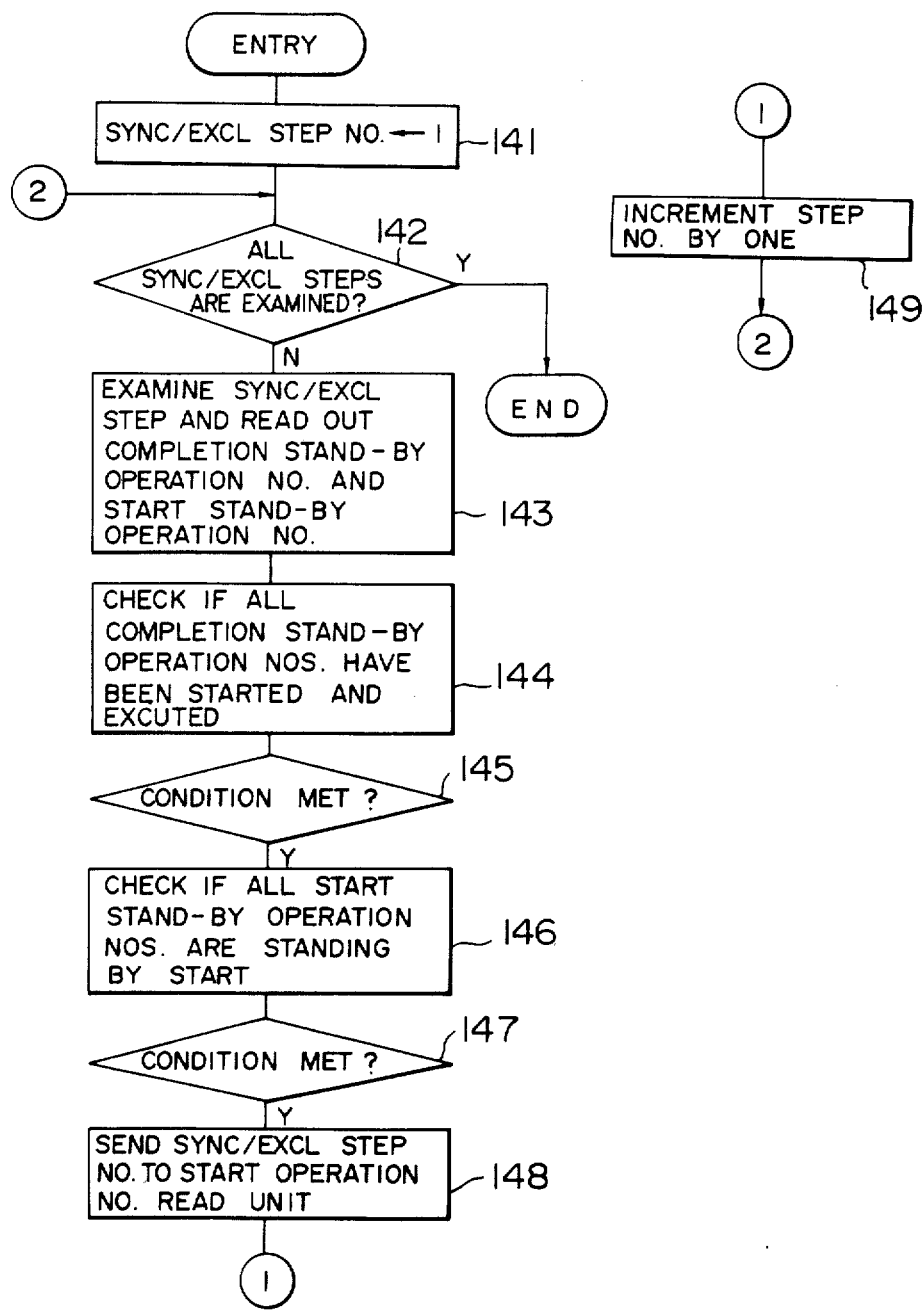
Figure 20:
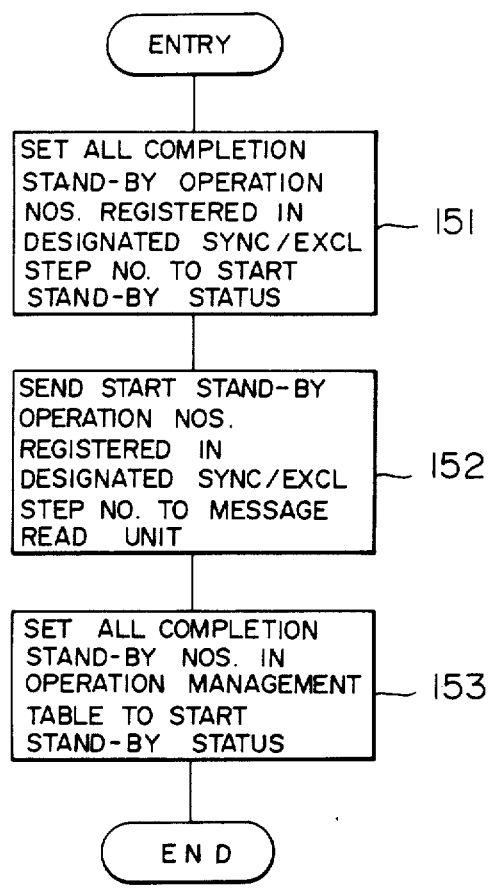

FIGS. 17 and 19 show process flow charts for the start of operation discrimination unit 40, and FIGS. 18 and 20 show process flow charts for the start operation number read unit 41.

The start of operation discrimination unit 40 sequentially reads out the synchronization/exclusion step numbers from the synchronization/exclusion step definition table 27 based on the preferential processing sequence numbers in accordance with the flow chart of FIG. 17, and reads out the completion stand-by and start stand-by operation numbers for the synchronization/exclusion step numbers read (arrow line 50). Then, the start management status 400 and the operation status 401 thereof are read from the operation management table 28 (arrow line 52). The executable condition of the synchronization/exclusion step read is determined, and if it is executable, it is sent to the start operation number read unit 41 (arrow line 51).

The start operation number read unit 41 reads out the corresponding start operation number from the synchronization/exclusion step definition table 27 in accordance with the flow chart of FIG. 18 (arrow line 57) and sends it to the message read unit 42 (arrow line 54). In this case, it refers to the operation management table 28 (arrow line 70) and sends the start operation numbers one by one while checking the execution of the operation number to be transmitted. It sets the start management status 400 of the corresponding operation number in the operation management table 28' of FIG. 14 to the started status and sets the operation status 401 thereof to the in-progress status (arrow line 56).

The message read unit 42 reads out the message number to be transmitted and the mask bit from the operation management table 28' based on the operation number (arrow line 54) sent from the start operation number read unit 41 (arrow line 64), and if the mask bit is not ON, it reads out the corresponding control information (bit patterns $m_1$–$m_4$ representing the program number to be started or the relay ON/OFF information) and the destination address from the control message table 29 using the message number as a key (arrow line 55) and sends them to the control message transmission unit 43 (arrow line 58). When the mask bit is ON, they are not transmitted. The start operation number is sent to the operation management information updating unit 45 (arrow line 61) and the measurement of the operation time is started.

The control message transmission unit 43 decodes the destination address and sends the control information to the controller of the corresponding machine tool (arrow line 59).

The machine tool responds to the control information sent from the supervisory controller 30' (arrow line 59) to execute the pretaught or preprogrammed unit operation, and when the unit operation has been executed, it sends the completion signal to the completion signal latch 44 (arrow line 60).

The operation management information updating unit 45 periodically refers to the content of the completion signal latch 44 (arrow line 53) and, when it detects the completion signal, it changes the operation status of the operation number from the in-progress status to the completed status (arrow line 62). It writes the measured operation time in the standard time column of the operation management table 28' and changes the operation status of the corresponding operation number from the in-progress status to the completed status (arrow line 62).

The supervisory controller 30' repeats the above operation until all registered synchronization/exclusion steps are started. In this manner, the serial start of the unit operations corresponding to the respective operation numbers within a correct range to prevent the parallel operation is assured, and the operation time of the unit operation is measured and recorded.

(b) Step 2

The switch 74 is connected to the line 76 and the switch 75 is connected to the line 77 to set the operation mode setting input 66 to the operation mode 2, and all mask bits of the operation management table 28' are set to "1" (no message transmitted). A parallel operation simulation is executed based on the operation times of the unit operations measured and recorded in the step 1.

The start of operation discrimination unit 40 reads out all synchronization/exclusion step numbers from the synchronization/exclusion step table 27' in accordance with the flow chart shown in FIG. 19 (while neglecting the preferential processing sequence numbers), reads out the completion stand-by and start stand-by operation numbers for the synchronization/exclusion step numbers read out (arrow line 50), then reads out the start management status 200' and the operation status 201' from the operation management table 28' (arrow line 52), determines the executable condition of the synchronization/exclusion step numbers read out and sends the executable synchronization/exclusion step number to the start operation number read unit 41 (arrow line 51). The start operation number read unit 41 reads out the corresponding start operation number from the synchronization/exclusion step definition table 27' in accordance with the flow chart of FIG. 20 (arrow line 57) and sends it to the message read unit 42 (arrow line 54). Unlike the step 1, the start operation numbers are sequentially sent without confirmation of the execution of the respective operation numbers. The start management status 200' of the corresponding operation number in the operation management table 28' is set to the started status and the operation status 201' is set to the in-progress status (arrow line 56).

The message read unit 42 reads out the message to be transmitted, from the operation management table 28' (arrow line 64) based on the operation number sent from the start operation number read unit 41 (arrow line 54), but since the mask bit is ON, it does not read out the control message from the control message table 29' to read it to the control message transmission unit 43. Then, it sends the start operation number to the simulation signal generator 73 (arrow line 76), starts to count the operation time and writes the start operation number and the start time in the operation performance record table 26'. The simulation signal generator 73 compares the count of the operation time with the standard time recorded in the operation management table 28', and when they coincide, changes the operation status of the operation number from the in-progress status to the completed status (arrow line 62), and writes the executed operation number and the completion time in the operation performance record table 26'.

Figure 21:
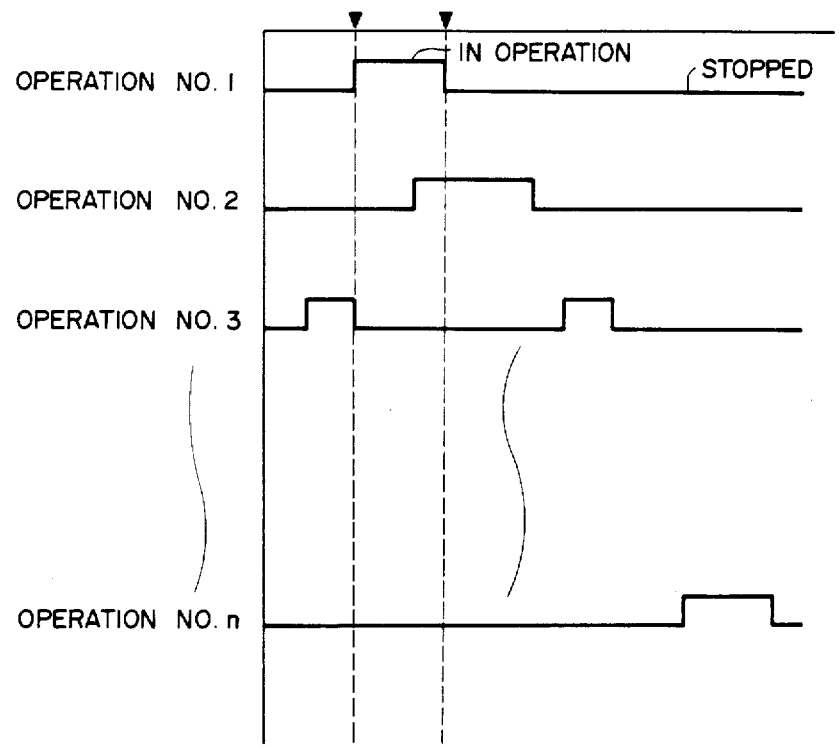
FIG. 21 shows a time chart of an operation sequence of machine tools.

The supervisory controller 30' repeats the above operation to prepare the data of the start and completion times of the respective operations in the operation performance record table 26. The time chart output unit 69 outputs a time chart shown in FIG. 21 by the monitor terminal (MN) 36 based on the prepared data (arrow line 72). In the waveforms of the operation numbers 1-n of FIG. 21, a high level period corresponds to the in-progress status and a low level period corresponds to a stop status, a broken arrow line indicates a cursor line. The beginning and the end of the operation period of each operation number are indicated by the cursor.

(c) Step 3

In the step 3, the time chart (FIG. 21) is examined to check if the operation sequence of the machine tools follows the desired time chart, and an appropriate delay time is set to the operation number in the synchronization/exclusion step definition table 27' in which undesirable interference (collision) between the machine tools is likely to occur, and the simulation of the step 2 is again executed to assure that the desired time chart is obtained.

Step 4

In the step 4, the machine tools are actually operated in acocrdance with the time chart obtained. For the operation number for which the interference between the machine tools occurs, the operation speed in the operation management table 28' is set to the low speed (while those for other operation numbers are set to the normal speed), mask bits for the message transmission for all operation numbers are cleared, the switch 74 is connected to the line 61 and the switch 75 is connected to the line 79, the operation mode setting input 66 is set to the operation mode 2 and the supervisory controller 30' is operated The start of operation discrimination unit 40 reads out all synchronization/exclusion step numbers from the synchronization/exclusion step definition table 27' in accordance with the flow chart of FIG. 19, checks to see if they are executable, and sends the executable synchronization/exclusion step numbers to the start operation number read unit 41 (arrow line 51). This operation is identical to that in the step 2.

Then, the start operation number read unit 41 sends the start operation numbers to the message read unit 42 in accordance with the flow chart of FIG. 20 (arrow line 54). This is also identical to the operation of the step 2.

The message read unit 42 reads out the message number to be transmitted, from the operation management table 28' (arrow line 64) based on the operation number sent from the start operation number read unit 41 (arrow line 54). Unlike the step 2, since the mask bit is OFF, it reads out the message to be transmitted and the destination from the control message table 29' and sends them to the control message transmission unit 43 together with the operation speed setting code (arrow line 58). It sends the start operation number to the operation management information updating unit 45 (arrow line 61), starts to count the operation time by the watch-dog timer and writes the start operation number, the start time and the transmitted control information in the operation performance record table 26' (arrow line 63).

The control message transmission unit 43 decodes the destination address and sends the control information and the operation speed setting code to the controller of the corresponding machine tool (arrow line 59).

The machine tool executes the pretaught or preprogrammed unit operation in accordance with the control operation and the operation speed setting code sent from the supervisory controller 30', and when the execution of the unit operation is completed, it sends the completion signal to the completion signal latch 44 (arrow line 60). The unit operation is executed at the normal speed or the low speed depending on the operation speed setting code. Thus, the machine tools operate at the normal speed where there is no risk of interference and operates at the low speed where there is a risk of interference.

The operation management information updating unit 45 periodically refers to the content of the latched completion signal (arrow line 53) to change the operation status of the operation number from the in-progress status to the completed status (arrow line 62), and writes the completed operation number and the completion time in the operation performance record table 26' (arrow line 81). It compares the measured operation time with the standard time recorded in the step 1, and if the operation time is abnormally short or long, it supplies an abnormal detection signal 78 to the monitor terminal (MN) 36 and steps the operation of the supervisory controller 30'. In this case, the time chart output unit 69 outputs the content of the operation performance record table 26' as a time chart (see FIG. 21). It is used as debugging information.

The supervisory controller 30' repeats the above operation to operate the machine tools in the designated operation sequence and operation speed. This step is repeated while changing the delay time in the synchronization/exclusion step definition table 27' of FIG. 12 until a desired operation sequence is obtained.

(ii) Operation in the normal mode

In the steps 1-4 of the start-up mode, it is confirmed that the machine tools operate in the desired operation sequence without interference. Then, the operation speeds of the operation units which were set to the low speed by the operation management table 28' are changed to the normal speed. Thus, when the supervisory controller 30' is operated in the same manner as the step 4 of the start-up mode, the machine tools are operated in the desired operation sequence and operation speeds.

Figure 22:
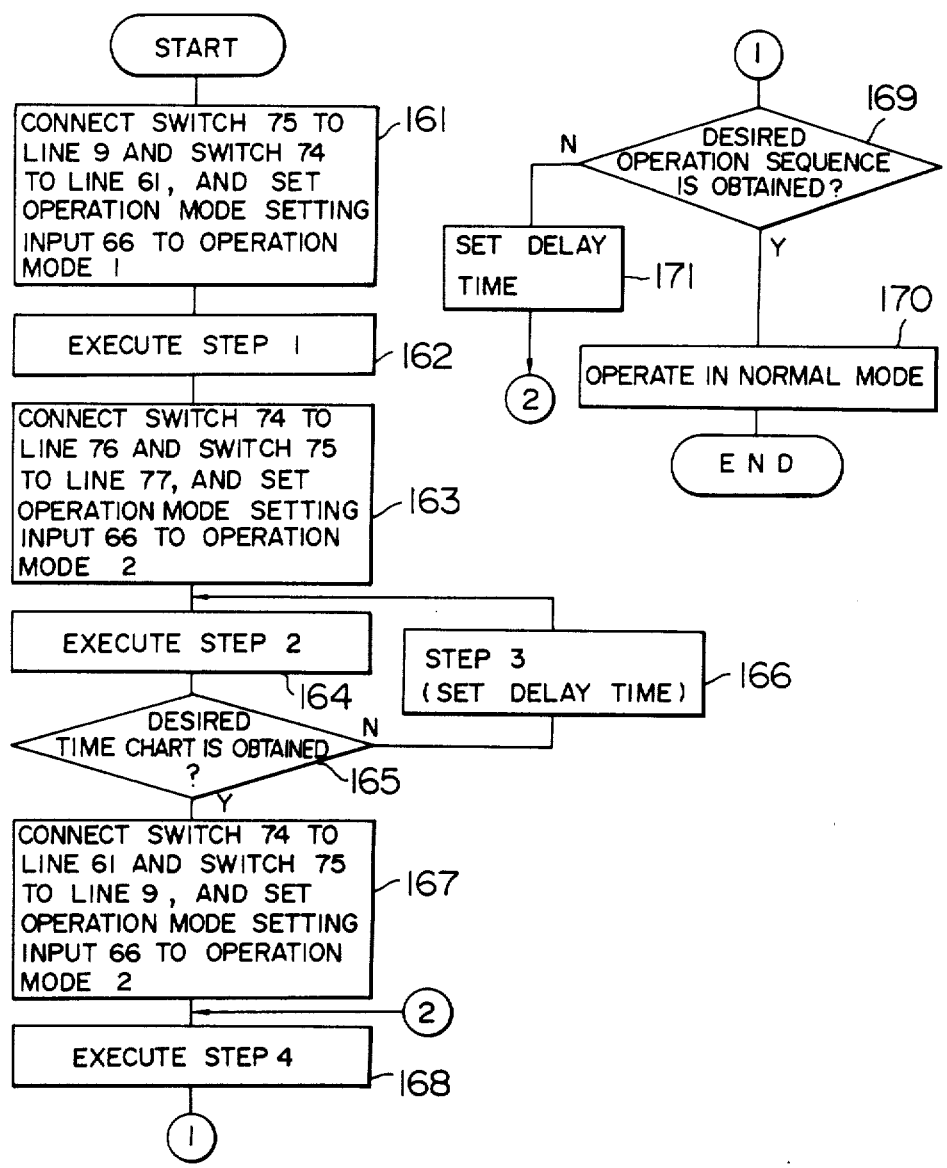
FIG. 22 shows a flow chart of a start-up operation of the operation sequence.

FIG. 22 shows a flow chart of the operation in controlling the start-up of the operation sequence.

In blocks 161 and 162, the switches 75 and 74 are switched and the operation mode setting input 66 is set to the operation mode 1 and the step 1 is executed. In blocks 163 and 164, the switches 75 and 74 are switched and the operation mode setting input 66 is set to the operation mode 2 and the step 2 is executed. If the desired time chart is not obtained after the execution of the step 2, the delay time is set in blocks 165 and 166 and the step 3 is executed. If the desired time chart is obtained, the switches 75 and 74 are switched, the operation mode setting input 66 is set to the operation mode 2 and the step 4 is executed in blocks 167 and 168. If the desired operation sequence is still not obtained, the delay time is again set and the step 4 is executed in blocks 169, 171 and 168. If the desired operation sequence is obtained, the normal mode operation is executed in a block 170.

In the embodiment of FIG. 11, when the operation sequence including the synchronization and the exclusion among the plurality of unit operations of the four machine tools is started up, the supervisory controller 30' automatically and selectively starts the unit operations stored in the robot operation teaching data memories 34 and 35 in accordance with the desired start-up sequence, by merely setting the combination of the unit operations to be synchronized or excluded and the start sequence of the unit operations in the start-up operation in the tables 27' and 28' in the supervisory controller memory 31'. Since necessary ones of the relays on the relay controller 26 can be selectively driven in accordance with the desired start-up sequence, the start-up of the complex part mounting sequence including the synchronization and the exclusion can be readily attained. Since the operation management table 28' contains the operation speed setting and the mask bit for the control message, any selected unit operation can be executed at a desired speed. Since it also contains the columns to read the standard time and the operation time, the abnormal operation time of the unit operation can be simply checked. Since the supervisory controller 30' has the simulation signal generation unit 73 and the operation performance record table 26', a time chart for the parallel operation of the plurality of machine tools can be obtained by the simulation in the supervisory controller 30' without actually operating the machine tools in parallel. Accordingly, undesired interference of the machine tools in the start-up operation can be predicted.

Since the delay time can be set in the synchronization/exclusion step definition table 27' for each operation number, the start timing of the operation sequence can be simply adjusted.

While the start management status 200' and the operation status 201' are separately recorded in the operation management table 28' of FIG. 14, they may be encoded together and recorded as one status.

While the supervisory controller 30' is independent from the robot controllers 32 and 33 in FIG. 11, they may be combined into one controller.

According to the embodiment described above, the complex cooperative operation sequence including the synchronization and the exclusion among the plurality of robots or machine tools can be simply attained as the combination of the pretaught or preprogrammed unit operations without taking the synchronization and the exclusion into consideration. Accordingly, a burden to the complex teaching data or program including the synchronization and the exclusion, which heretofore needed a long time to prepare, is substantially reduced and the system start up time is shortened.

In the execution of the operation sequence, since a designated one of the plurality of operation parameters for one unit operation can be started, the cooperative work comprising a number of operation patterns can be attained by the combination of a small number of unit operations, and the memory capacity of the memory for storing the operation sequence and the manpower for programming can be reduced. In the start-up mode, the unit operations can be sequentially executed, one by one, in any sequence by merely setting the start-up operation sequence in the table, and after no error in the respective unit operations has been confirmed, the cooperative operation in the normal operation mode can be attained by merely changing the operation mode. Accordingly, the sequence start-up is efficient.

When the unit operations are sequentially executed, one by one, in accordance with the start-up sequence, the operation times of the respective unit operations are automatically measured and recorded, the cooperative operation in the normal operation mode is simulated based on the measurement of the operation times, and the result is outputted as the time chart. Accordingly, the interlock among the unit operations can be checked without actually executing the complex cooperative operation including the synchronization and the exclusion which may include a risk of collision. Accordingly, the system start-up is attained safely and efficiently.

In the start-up operation, the delay time for delaying the start timing is set for each unit operation, the mask is set to selectively allow the execution of the operation and the unit operation is executed in accordance with the operation speed setting. Accordingly, any unit operation can be executed at the desired timing and speed and the adjustment of the start-up is efficiently done.

Figure 23:
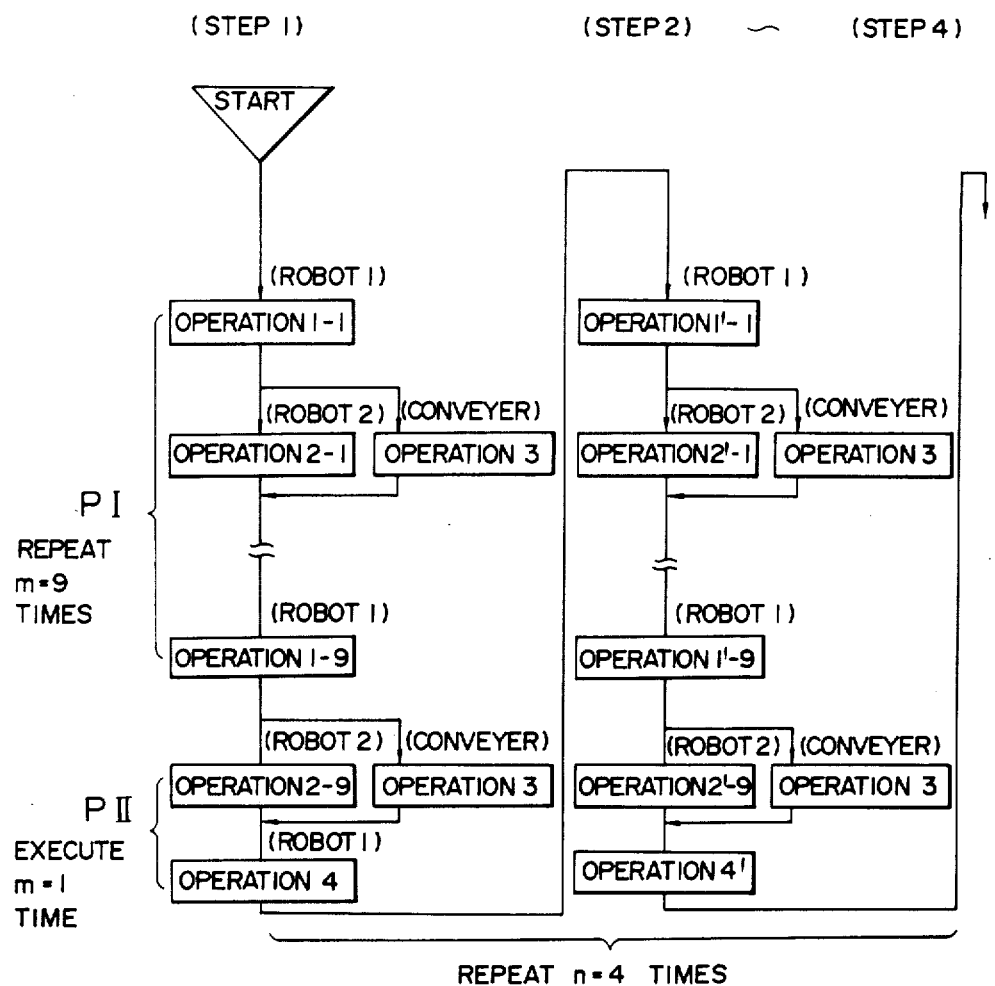
FIG. 23 shows a flow chart for repetitive operations of similar operations.
Figure 24:
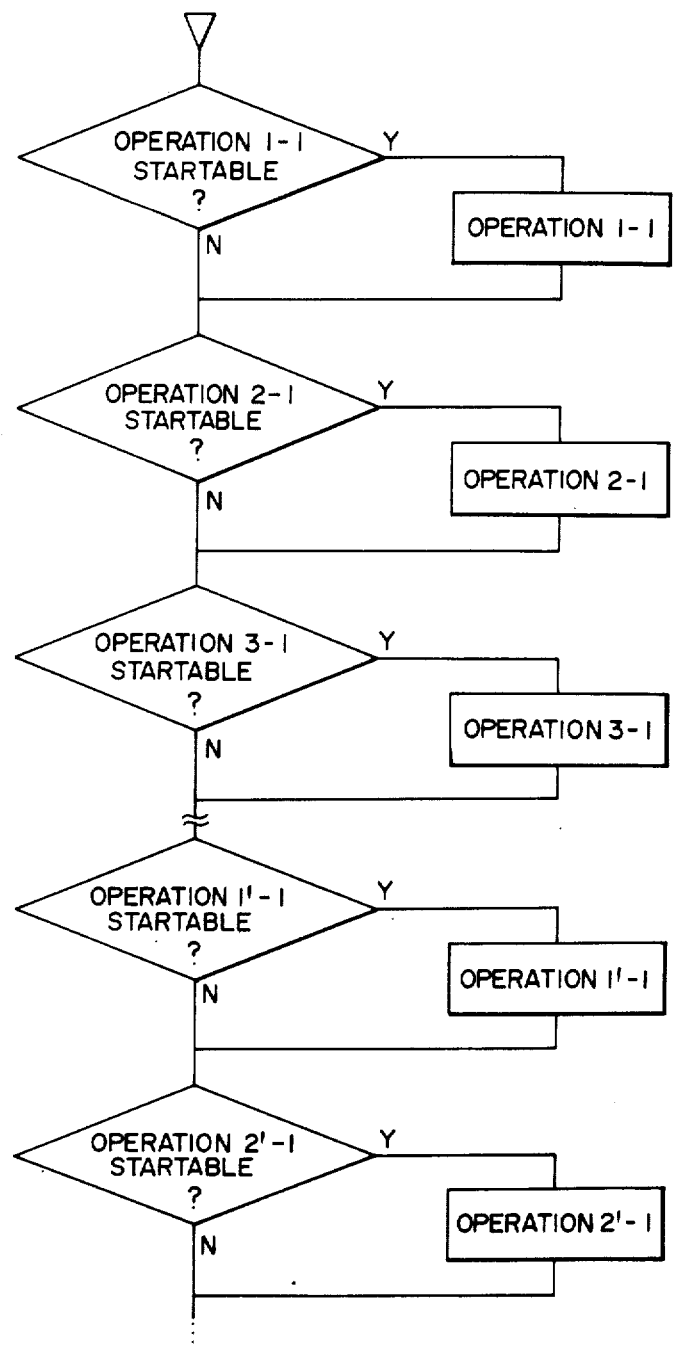
FIG. 24 shows a start flow chart of a prior art sequence controller.

Referring now to FIGS. 23 and 24, the repetitive operation sequence control is explained.

FIG. 23 shows a flow chart for a repetitive operation of similar works, and FIG. 24 shows a flow chart of starting operation by a conventional sequencer.

FIG. 23 shows the repetitive operation of the similar works by two robots including a robot 1 and a robot 2, and a conveyer. The robot 1 executes an operation 1-1 (e.g. handles a part on the conveyer), and then the robot 2 executes an operation 2-1 (e.g. drive a screw of the handled part) and, at the same time, the conveyer executes an operation 3 (e.g. shifts a part feed conveyer). The above operations are repeated for nine kinds of parts, and finally the robot 1 executes an operation 4 (e.g. removes an assembled work). The above operations are sequentially repeated for four kinds of works (n=4, steps 1-4).

In controlling those series of operation sequences, the execution sequence of the operations shown in FIG. 23 are stored in a memory as start conditions of the respective operations, and the executable conditions of the operations are checked in accordance with the flow chart of FIG. 24, and if executable, the operations (1-1, 2-1, 3-1, . . . . . ) are executed (e.g. output relays are turned ON or OFF).

An embodiment of the repetitive operation sequence control is described below.

Figure 25:
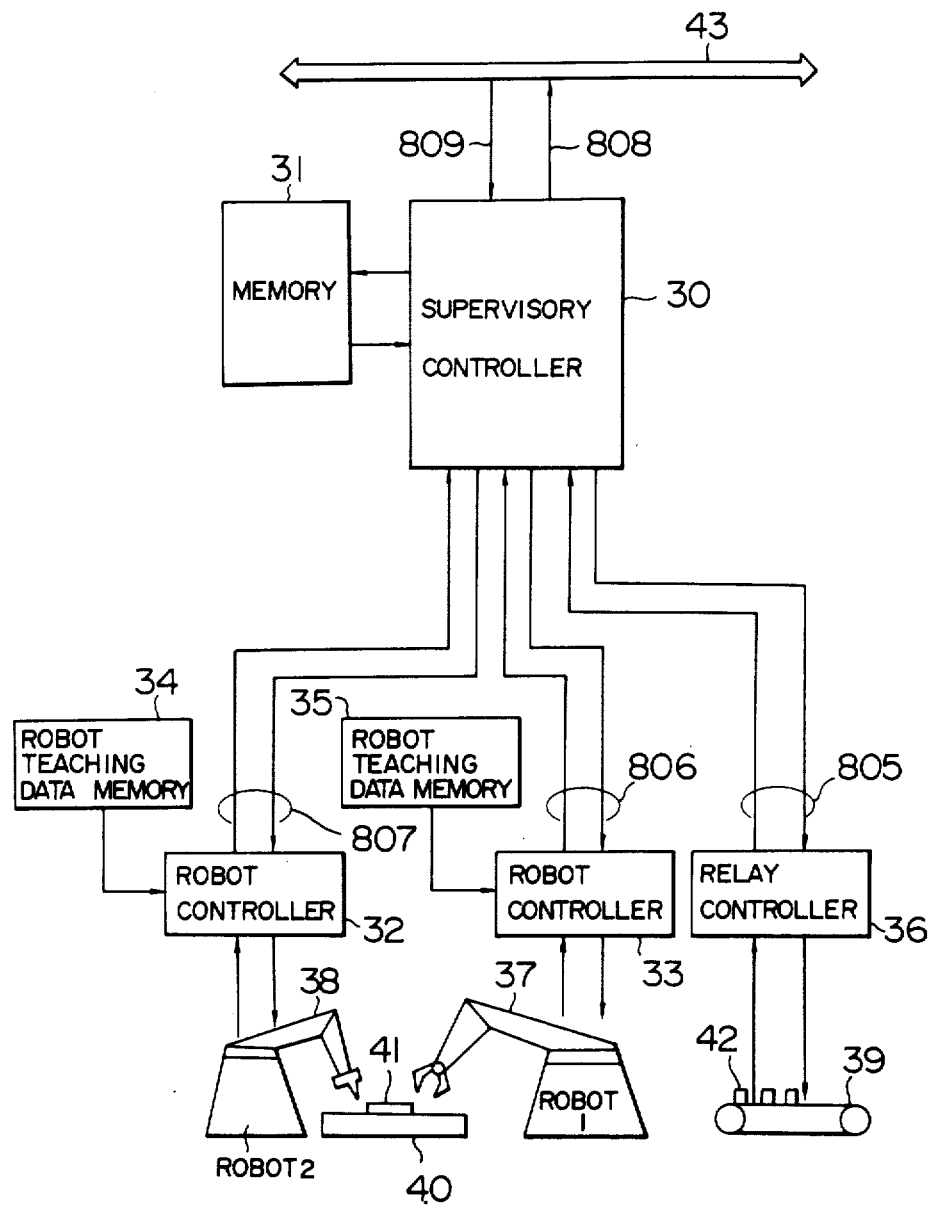
FIG. 25 shows a configuration of an operation sequence controller in accordance with an embodiment of the present invention.

FIG. 25 shows the configuration of a control system of a part mounting station in the repetitive operation sequence control, in accordance with a first embodiment of the present invention.

Numeral 30 denotes a supervisory controller, numeral 31 denotes a supervisory controller memory, numerals 32 and 33 denote robot controllers, numerals 34 and 35 denote robot teaching data memories, numeral 36 denotes a relay controller and numerals 37 and 38 denote playback type robots. The robot 37 corresponds to the robot 1 (part handling robot) and the robot 38 corresponds to the robot 2 (screw driving robot). Numeral 39 denotes a part feeding conveyer, numeral 40 denotes an assembling table, numeral 41 denotes a base on which a part is to be mounted, numeral 42 denotes a part to be mounted, and numeral 43 denotes a local network bus. An arrow line 809 indicates a work command to the supervisory controller 30, an arrow line 808 indicates a work completion report from the supervisory controller 30, arrow lines 806 and 807 indicate control signals exchanged between the robot controllers 32 and 33 and the supervisory controller 30, and an arrow line 805 indicates a control signal exchanged between the relay controller 36 and the supervisory controller 30.

The work command 809 sent from an external device or a command center through the local network bus 43 is read into the supervisory controller 30. The supervisory controller 30 refers to the repetitive control information of the similar works stored in the supervisory controller memory 31 and the status (control signals 805, 806 and 807) of the robot controllers 32 and 33 or the relay controller 36 to control the repetitive operation sequence of the similar works, and when the work sequence has been completed, it sends the work completion report 808 to the local network bus 43.

Figure 26:
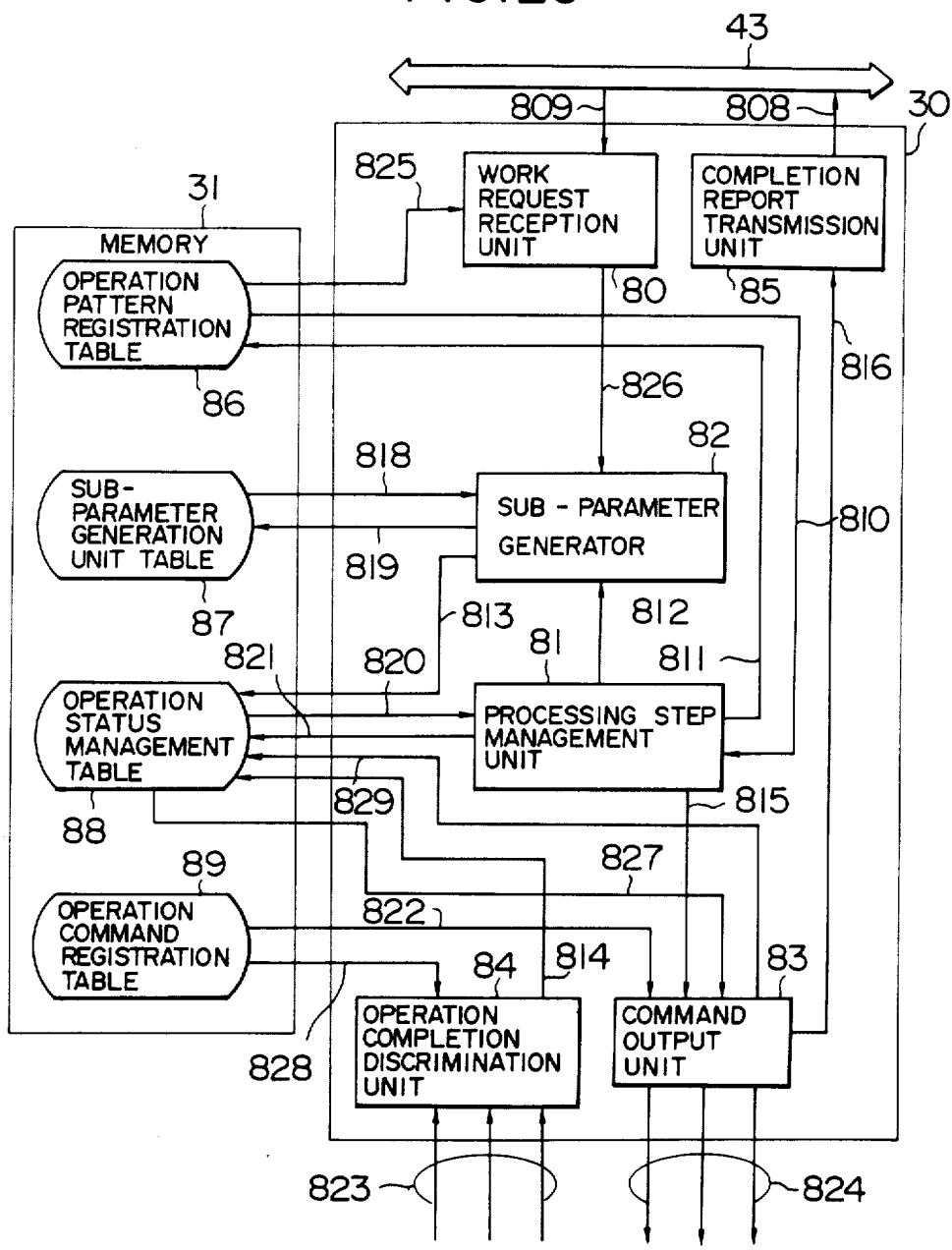
FIG. 26 shows a configuration of a supervisory controller and a supervisory controller memory of FIG. 25.

FIG. 26 shows a configuration of the supervisory controller 30 and the supervisory controller memory 31 of FIG. 25.

Numeral 80 denotes a work request reception unit, numeral 81 denotes a processing step management unit, numeral 82 denotes a sub-parameter generator, numeral 83 denotes an operation command output unit, numeral 84 denotes an operation completion control unit and numeral 85 denotes a work completion report transmission unit. In the memory 31, numeral 86 denotes an operation pattern registration table, numeral 87 denotes a sub-parameter generation table, numeral 88 denotes an operation status management table and numeral 89 denotes an operation command registration table.

The operation of the supervisory controller 30 is first explained, and then a method for registering the operation sequence in the supervisory controller memory 31 will be explained.

When the work request reception unit 80 receives the work command, that is, an operation parameter and a generation sequence number through the local network bus 43, it reads out a completion stand-by operation number of a process number 1 from the operation pattern registration table 86.

The work request reception unit 80 reads out the completion stand-by operation number of the process number 1 among the process numbers 1-5, from the operation pattern registration table 86 (arrow line 825), and sends it to the sub-parameter generator 82 together with the operation parameter and the generation sequence number received from the network bus 43 (arrow line 826).

The completion stand-by operation number (-101) of the process number 1 in the operation pattern registration table 86 of FIG. 28 is a special operation number for generating a sub-parameter when the work request reception unit 80 receives the work request and it starts the operation sequence registered in the operation pattern registration table 86. The work request reception unit 80 reads out the completion stand-by operation number from the operation pattern registration table 86 each time the work command is sent, and sends it to the sub-parameter generator 82.

The sub-parameter generator 82 refers the sub-parameter generation table 87 (FIG. 29) and the operation status management table 88 (FIG. 30) based on the received operation number, operation parameter and generation sequence number.

Figure 32:
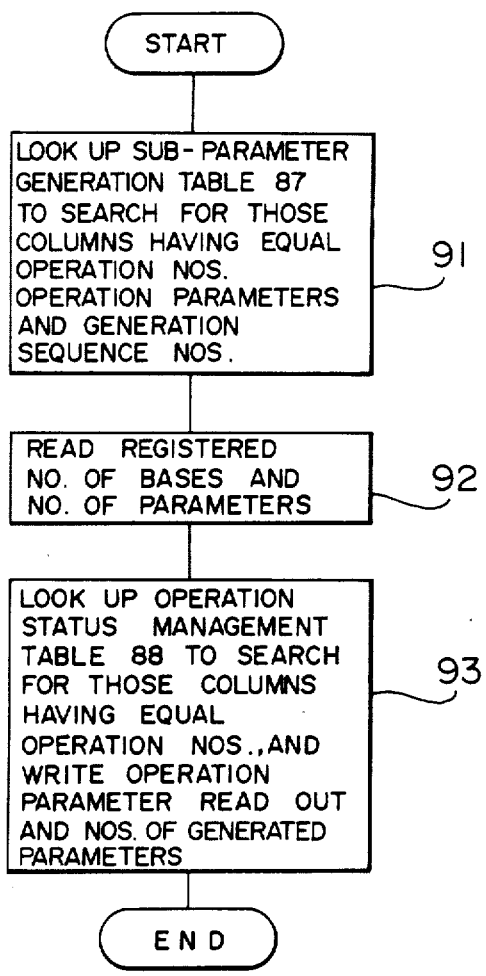
FIG. 32 shows a operation flow chart for an operation step management unit of FIG. 26.

FIG. 32 shows a process flow chart of the sub-parameter generator 82.

In a block 91 of FIG. 32, the sub-parameter generation table 87 is looked up to search for those columns which have equal operation numbers, operation parameters and generation sequence numbers, that is, those columns which have equal operation numbers as that read from the operation pattern registration table 86 and equal operation parameters and generation sequence numbers as those sent from the network bus 43. In a block 92, the number of bases and the number of parameters in that column are read out (arrow line 818), and in a block 93, they are written into the columns of the operation parameter and the number of parameters for the corresponding operation number in the operation status management table 88 (arrow line 813).

Figure 33A:
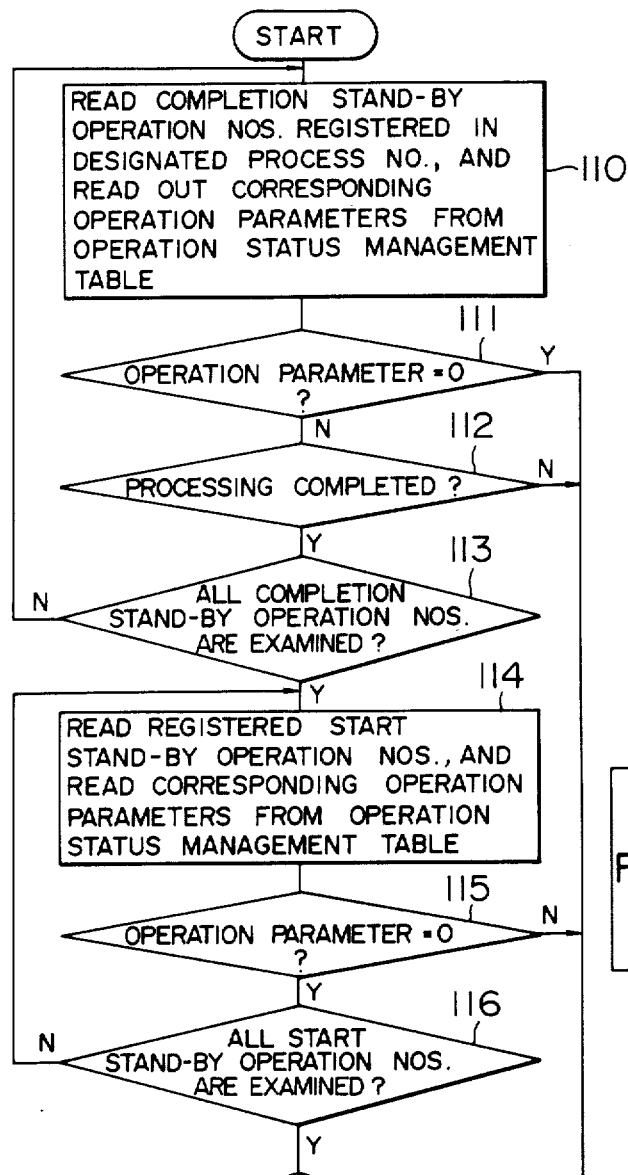
FIGS. 33, 33a and 33b shows an operation flow chart of a parameter generation unit of FIG. 26.
Figure 33:
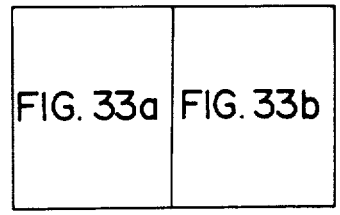
Figure 33B:
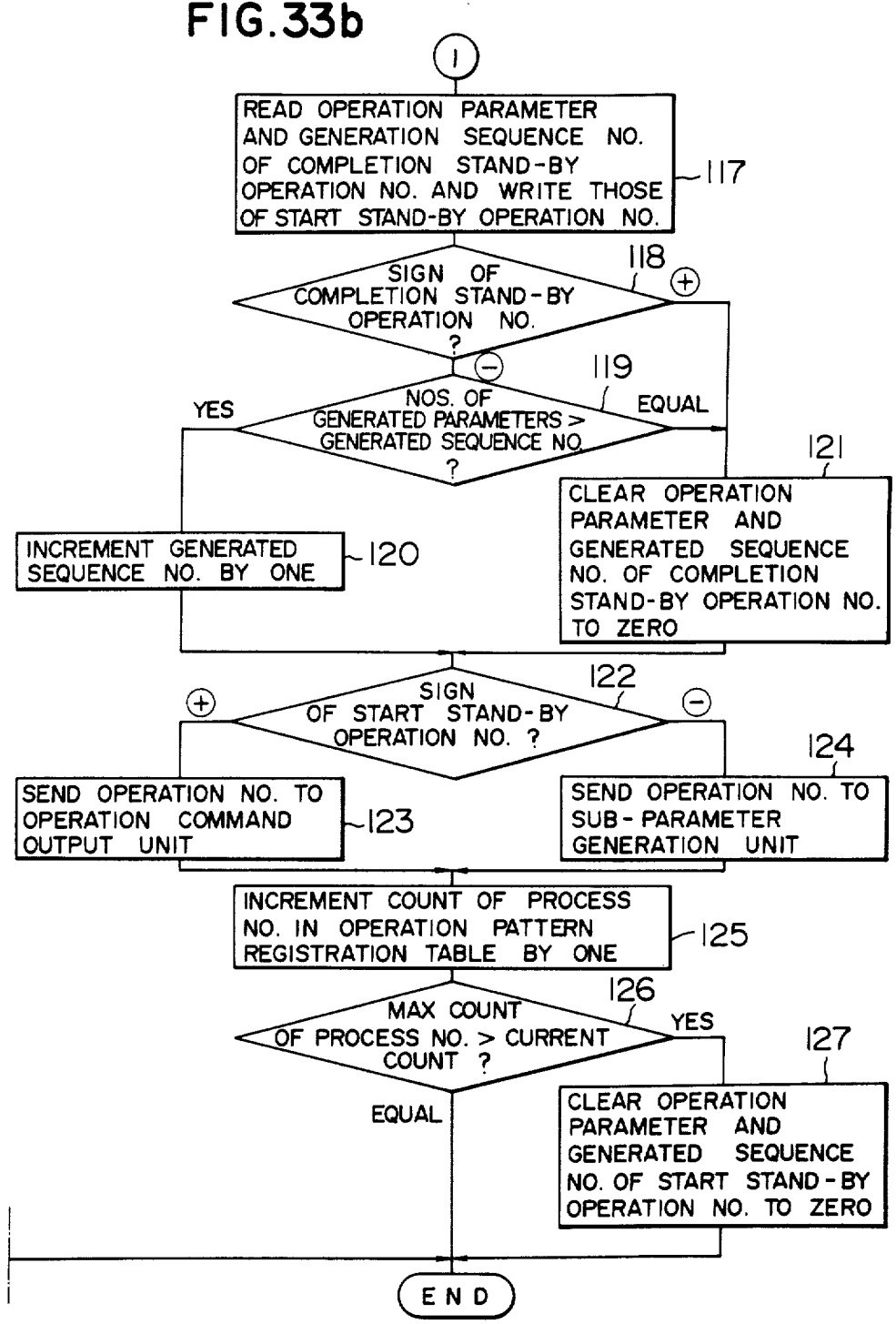

The process step management unit 81 in FIG. 26 is periodically started and operates in accordance with a flow chart of FIG. 33.

In a block 110, it sequentially reads out the completion stand-by numbers for the process number registered in the operation pattern registration table 86 of FIG. 28 (arrow line 810). It refers the operation parameter, the generation sequence number and the process status of the operation status management table 88 (arrow line 820) based on the completion stand-by numbers, and reads them out.

In blocks 111–113, it checks if the operations corresponding to the completion stand-by operation numbers read out are executable. It checks if the operation parameter is "0" and the process status is "0" (completed status), for each of the completion stand-by operation numbers. In a block 114, the start stand-by operation numbers are sequentially read out from the operation pattern registration table 86 in the same manner, and the corresponding parameters are read out from the operation status management table 88. In blocks 115 and 116, like in the blocks 111 and 113, it checks to see if the operation parameter is "0" for each of the start stand-by operation numbers. In a block 117, if the operation corresponding to the start stand-by operation number is executable, it writes the operation parameter and the generation sequence number in the column designated by the completion stand-by operation number of the operation status management table 88 into the columns of the operation parameter and the generation sequence number of the column designated by the start stand-by operation number, based on the completion stand-by operation numbers and the start stand-by operation numbers read from the operation pattern registration table 86.

In blocks 118–121, it checks the sign of the completion stand-by operation number, and if it is positive, it clears the operation parameter and the generation sequence number of the column designated by the completion stand-by operation number of the operation status management table 88 of FIG. 30 to zero. If the sign of the completion stand-by operation number is negative, it compares the number recorded in the column of the number of parameters in the column designated by the operation number of the table of FIG. 30 with the number in the column of the generation sequence number (block 119). If the generation sequence number is smaller, it is incremented by one (block 120). If the generation sequence number is equal to the number of parameters, it clears the operation parameter and the generation sequence number to zero (block 121).

In blocks 122–124, the start stand-by operation numbers having negative signs are sent to the sub-parameter generator 82 (arrow line 812), and the operation numbers having the positive signs are sent to the operation command output unit 83 (arrow line 815).

Finally, it increments the current count for that process number of the operation pattern registration table 86 by one (block 125) and compares the MAX count with the current count (block 126). Only when the current count is smaller than the MAX count, will it read out the start stand-by operation number for the process number and clear the operation parameter and the generation sequence number of that operation number of the table of FIG. 30 to zero (block 127).

The operation of the process step management unit 81 has thus been described. When the sub-parameter generator 82 receives the operation number of negative sign from the process step management unit 81, it writes the number of the buses and the number of the parameters in the sub-parameter generation table 87 into the columns of the operation parameter and the number of the parameters for the corresponding operation number of the operation status management table 88, in accordance with the flow chart of FIG. 32. The operation of the sub-parameter generator 82 has been described above.

On the other hand, when the operation command output unit 83 receives the operation number of positive sign, it reads out the operation parameter and the generation sequence number of the column designated by the operation number, from the operation status management table 88 (arrow line 827). Based on the content read, it reads out the operation command and the destination of the column having an equal operation parameter, and a generation sequence number, from the operation command registration table 89 of FIG. 31 (arrow line 822), and sends the operation command to the designated destination (arrow line 824). It turns on the transmission bit 891 for the operation command of FIG. 31 and sets the process status of that operation number in the operation status management table 88 to "1" (in process). When it receives the operation number 999, it determines that all of the operation steps of the sequence have been completed, and sends the work completion signal to the work completion report transmission unit 85 (arrow line 816). Thus, the operation number 999 is a special operation number used to detect the completion of the work.

The operation of the operation command output unit 83 has thus been described.

The operation completion discrimination unit 84 searches for the operation number having the operation command transmission bit turned ON in the operation command registration table 89 of FIG. 31 and reads out the completion determination formula (arrow line 828), logically operates on the completion determination formula using the latched external input signal (arrow line 823), and sets the process states of the operation number for which the result of the completion determination formula is true, of the operation status management table 88 to "0" (completed status) (arrow line 814).

When the work completion report trnsmission unit 85 receives the work completion signal from the operation command output unit 83 (arrow line 816), it sends out the work completion report to the local network bus 43.

The operation of the supervisory controller 30 has thus been described.

FIG. 27 shows a flow chart of a basic operation pattern registered in the operation pattern registration table 86.

When the supervisory controller 30 executes the repetitive operation sequence of the similar works of FIG. 23, it is necessary to register the operation sequence in the supervisory controller memory 31. In the repetitive operation of the similar works of FIG. 23, the operation sequence may comprise a combination of basic operation patterns P I and P II shown in FIG. 27. For one step, the basic operation pattern P I is repeated nine times, then the basic operation pattern P II is executed once.

The above operations are further repeated n=4 times (steps 1-4) to execute the operation sequence of FIG. 23. The basic operation patterns P I and P II are registered in the operation pattern registration table 86 in a format shown in FIG. 28.

As shown in FIG. 28, the basic operation patterns are registered as a combination of the completion stand-by operation numbers and the start stand-by operation numbers. An identification number called a process number is added to the combination, and the operation number represents several individual specific operations. For example, the operation number 10 represents the operations (1-1 to 1-9, 1'-1 to 1'-9, ... ) of the robot 1 shown in FIG. 23, and the operation number 20 represents the operations (2-1 to 2-9, 2'-1 to 2'-9, ... ) of the robot 2. The operation number 30 represents the operation 3 of the conveyer and the operation number 40 represents the operation 4 of the robot 1. The operations to be executed for those operation numbers are selected from the operation command registration table 89 by the operation parameters when the supervisory controller 30 operates.

In the basic operation pattern P I in FIG. 27, the operation (operation number 20) of the robot 2 and the operation (operation number 30) of the conveyer are started after the operation (operation number 10) of the robot 1 has been completed. Accordingly, as the basic operation patter P I, the completion stand-by operation number 10 and the start stand-by operation numbers 20 and 30 are registered as shown in the column of the process number 3 in FIG. 28. Similarly, in the basic operation pattern P II, the operation (operation number 40) of the robot 1 is started after the operation (operation number 20) of the robot 2 and the operation (operation number 30) of the conveyer have been completed. Accordingly, as the basic operation pattern P II, the completion stand-by operation numbers 20 and 30 and the start stand-by operation number 40 are registered as shown in the column of the process number 4 in FIG. 28.

Information on repetition section and the number of times of repetition for the basic operation patterns P I and P II registered in the columns of the process numbers 3 and 4 are registered in the operation pattern registration table 86 of FIG. 28.

In the repetitive operation sequence of the similar works shown in FIG. 23, it is necessary to repeat the basic operation pattern P I of FIG. 27 nine times and execute the basic operation pattern P II once, and repeat the above operations four times (steps 1-4).

In order to register the information to repeat the basic operation pattern P I nine times in the operation pattern registration table 86 of FIG. 28, the sub-parameter generation operation number −100 is registered as the completion stand-by operation number for the process number 2 and the start stand-by operation number 10 is registered. The operations of the basic operation pattern P I are registered in the column of the process number 3, and a maximum number of times of repetition of 9 is set as a MAX count for the process number 3 corresponding to the basic operation pattern P I. The number of bases and the number of parameters of the sub-parameter (operation parameter and generation sequence number) to be generated in accordance with the operation parameter and the generation sequence number are registered in the column of the operation number −100 in the sub-parameter generation table 87 of FIG. 29. In the example of FIG. 29, if the operation parameter 1000 and the generation sequence number 0 are designated for the operation number −100 when the supervisory controller 30 executes the process number 2, the supervisory controller 30 generates nine sub-parameters, that is, operation parameter 1000, generation sequence numbers 0-8. When the operation parameter 1000 and the generation sequence numbers 1, 2 and 3 are designated, it also generates as many sub-parameters as designated in accordance with the number of bases and the number of parameters registered in the table of FIG. 29.

The machine tools to be actually started by the supervisory controller 30 and the operations thereof and the conditions of the completion of the operations, for the completion stand-by operation number 10 and the start stand-by operation numbers 20 and 30 of the process number 3 corresponding to the basic operation pattern P I are registered in the columns of the destination, the operation command and the completion determination formula of the operation command registration table 89 of FIG. 31, for each sub-parameter.

Thus, the supervisory controller 30 repeatedly executes the operation pattern P I nine times in accordance with the generated sub-parameters. The contents of the individual repetitive operations differ depending on the sub-parameters.

Then, in order to execute the basic operation pattern P II once, the basic operation pattern P II is registered in the column of the process number 4 in the operation pattern registration table of FIG. 28 and a MAX count thereof is set to "1". The machine tool to be actually started by the supervisory controller 30, the operation thereof and the condition of the completion of the operation, for the start stand-by operation number 40 are registered in the operation command registration table 89 of FIG. 31. Thus, the supervisory controller 30 executes the basic operation pattern P II once.

In the operation sequence of FIG. 23, it is necessary to execute the registered basic operation pattern P I nine times and the basic pattern P II once, and execute the above operations four times (steps 1-4).

In order to register it in the operation pattern registration table 86 of FIG. 28, the sub-parameter generation operation number −100 is registered as the completion stand-by operation number for the process number 1 and the start stand-by operation number −100 is registered. The last operation number 40 in the steps 1-4 for the process number 5 is registered as the completion standby operation number, and the operation sequence completion detection operation number 999 is registered as the start stand-by operation number, and the MAX count is set to 4.

Then, the number of bases 1000 and the number of parameters 4 are registered in the column of the operation number −101 in the sub-parameter generation table 87 of FIG. 29, as the information to generate the operation parameter 1000 and the generation sequence numbers 0-3 when the operation parameter 100 and the generation sequence number 0 are designated as the work command (arrow line 809).

Thus, the supervisory controller 30 sequentially generates the operation parameter 1000 and the generation sequence numbers 0-3 and repeatedly executes the steps 1-4.

By registering the operation sequence described above in the supervisory controller memory 31, the supervosory controller 30 can execute the repetitive operation sequence of the similar works shown in FIG. 23. In the present embodiment, the repetitive operation sequence of the similar works for the three machine tools (robots 1 and 2 and conveyer) of FIG. 25 can be simply controlled by merely registering the two basic operation patterns P I and P II shown in FIG. 27. By combining the operations in the function level of "drive a screw" or "grasp a part" and registering them as a common basic pattern, the supervisory controller 30 generates the sub-parameter (operation parameter and generation sequence number) as many times as the number of times of repetition when it executes the operation sequence, and selectively starts the specific screw driving operation (for screw 1, 2 or . . . . . ) and the specific part grasping operation (for part 1, 2 or . . . . . ), and the operation sequence is repeated as many times as the number of sub-parameters generated.

Accordingly, the manpower to register the desired operation sequence in the supervisory controller memory 31 is considerably reduced and the modification of the operation sequence is simplified. The capacity of the memory for storing the operation sequence is reduced.

In the present embodiment, the sub-parameter is divided into the operation parameters and the generation sequence numbers, which are stored in the sub-parameter generation table 87 of FIG. 29, the operation status management table 88 of FIG. 30 and the operation command registration table 89 of FIG. 31, although they may be combined and stored as one parameter. While the supervisory controller 30 is independently arranged from the robot controllers 32 and 33 or the relay controller 36, they may be combined into one unit.

As described hereinabove, according to the present embodiment, the repetitive operation sequence of the similar works which differ in the content of the work but are common as the work sequence is stored in the memory, and when it is executed, the basic operation pattern common to the repetitive works and the contents of the operations are separately stored, the operation parameters are generated in accordance with the desired operation content and the number of times of repetition, and the corresponding operation is selectively executed as many times as the number of parameters generated. Accordingly, the burden to the programming of the repetitive operation sequence of the similar works is considerably reduced, less memory capacity is required and the system start-up time is shortened. The number of times of repetition of the operation sequence or the operation content can be modified by changing the contents and the number of the operation parameters generated when the operation sequence is executed. Accordingly, the manpower and the time required to change the sequence program for the modification can be reduced.

As described hereinabove, according to the present invention, the cooperative work by a plurality of robots and the repetitive operation of the similar works can be readily executed.

We claim:

1. A method for controlling an operation sequence in a control system for controlling a series of operations in an operation sequence including synchronization and exclusion, by combining pretaught or preprogrammed unit operations for an automatic machine, such as a robot, said control system comprising:

first memory means for storing a start sequence of the unit operations to be synchronized or excluded, including control programs having a designated execution order;

second memory means for storing an operation status of the unit operations; and third memory means for storing an operation command for starting the unit operations;

said method comprising the steps of:

(a) determining the unit operations to be started by looking up the execution order of control programs included in the start sequence of the unit operations and the operation status stored in said first and second memory means; and (b) reading out the corresponding operation command from said third memory means to sequentially start the unit operation.

2. A method for controlling an operation sequence according to claim 1 wherein said third memory means stores a plurality of operation commands for one unit operation, and the step (b) includes selecting the operation command to be outputted in accordance with the operation status of the unit operation so that one of a plurality of operation commands is issued to one unit operation.

3. A method for controlling an operation sequence according to claim 1 wherein said first memory means includes at least one start sequence, and the step (a) includes determining the unit operation to be started by referring to the selected start sequence and the operation status of the unit operations stored in the second memory means, and the step (b) includes outputting the corresponding operation command from the third memory means to start the selected unit operation.

4. A method for controlling an operation sequence in accordance with claim 1 wherein said first memory means stores the start sequences for a normal operation mode and a start-up mode for each unit operation, and the step (a) includes determining the unit operation to be started in the start-up mode by referring to the start-up mode start sequence and the operation status of the unit operations, and the step (b) includes starting the selected unit operation by the operation command related to the selected unit operation.

5. A method for controlling an operation sequence in accordance with claim 3, wherein said first memory means stores the start sequences for a normal operation mode and a start-up mode for each unit operation, and the step (a) includes determining the unit operation to be started in the start-up mode by referring to the start-up mode start sequence and the operation status of the unit operations, and the step (b) includes starting the selected unit operation by the operation command related to the selected unit operation.

6. A method for controlling an operation sequence according to claim 1, wherein said first memory means includes an area for storing a start-up mode sequential start sequence for starting the unit operation, one by one, in a start-up mode and an area for storing parallelly operating basic operation sequences so that the parallelly operating basic operation sequences and the start-up mode serial start sequence are selectively executed.

7. A method for controlling an operation sequence according to claim 3, wherein said first memory means includes an area for storing a start-up mode sequential start sequence for starting the unit operation, one by one, in a start-up mode, and an area for storing parallelly operating basic operation sequences so that the parallelly operating basic operation sequences and the start-up mode serial start sequence are selectively executed.

8. A method for controlling an operation sequence according to claim 4, wherein said first memory means includes an area for storing a start-up mode sequential start sequence for starting the unit operation, one by one, in a start-up mode and an area for storing parallelly operating basic operation sequences so that the parallelly operating basic operation sequences and the start-up mode serial start sequence are selectively executed.

9. A method for controlling an operation sequence according to claim 4, further comprising the steps of:
measuring an operation time of the unit operation started in accordance with this start-up mode start sequence;
simulating an operation sequence of the unit operations in the normal operation mode by referring to the measured operation time of the unit operation and the normal operation mode start sequence; and
outputting a result of operation sequence simulation as a time chart.

10. A method for controlling an operation sequence according to claim 6, further comprising the steps of:
measuring an operation time of the unit operation started in accordance with the start-up mode start sequence;
simulating an operation sequence of the unit operations in the normal operation mode by referring to the measured operation time of the unit operation and the normal operation mode start sequence; and
outputting a result of operation sequence simulation as a time chart.

11. A method for controlling an operation sequence according to claim 4, wherein the step (b) includes specifying in areas of said third memory means different operation speeds for the normal operation mode and the start-up mode, for each operation command.

12. A method for controlling an operation sequence according to claim 6, wherein the step includes specifying in areas of said third memory means different operation speeds for the normal operation mode and the start-up mode, for each operation command.

13. A method for controlling an operation sequence according to claim 9, wherein the step (b) includes specifying in areas of said third memory means different operation speeds for the normal operation mode and the start-up mode, for each operation command.

14. A method for controlling an operation sequence according to claim 1, wherein said third memory means includes mask bits for inhibiting the output of the operation command so that in the step (b) only the unit operations having no mesh bit set thereto are started.

15. A method for controlling an operation sequence according to claim 1, wherein said first memory means has an area for setting delay times to delay the start of the unit operations by specified times, and including modifying the start timing of the operation sequence in accordance with the set delay times.

16. An apparatus for controlling an operation sequence in a sequence controller for executing a repetitive operation of similar works for an automatic machine such as a robot, comprising:
memory means for storing a basic operation pattern common to the repetitive operation and the number of times of repetition separately from contents of operations;
means for generating as many sub-parameters as the number determined by the stored number of times of repetition and contents of operation when the operation sequence is executed;
means for selecting a desired operation content based on the stored basic operation pattern and the generated sub-parameters; and
means for executing the selected operation content as many times as the number of sub-parameters and counting the number of times of execution of the basic operation pattern executed at an end of a repetitive section.

17. An apparatus for controlling an operation sequence according to claim 16, wherein said memory means includes an area for storing operation parameters and operation status of unit operations, an area for storing at least one operation command for each unit operation for each operation parameter, an area for storing at least two unit operation start sequences and an area for storing operation parameter generation information.

* * * * *